(12) United States Patent
Seiders et al.

(10) Patent No.: US 11,453,526 B2
(45) Date of Patent: Sep. 27, 2022

(54) PORTABLE CONTAINER AND CONTAINER ASSEMBLY

(71) Applicant: YETI Coolers, LLC, Austin, TX (US)

(72) Inventors: Roy Joseph Seiders, Austin, TX (US); Andy Bondhus, Austin, TX (US); Steve Charles Nichols, Austin, TX (US); Dennis Zuck, Austin, TX (US); Andrew M. Bosway, Austin, TX (US)

(73) Assignee: YETI Coolers, LLC, Austin, TX (US)

( * ) Notice: Subject to any disclaimer, the term of this patent is extended or adjusted under 35 U.S.C. 154(b) by 43 days.

(21) Appl. No.: 17/017,863

(22) Filed: Sep. 11, 2020

(65) Prior Publication Data

US 2020/0407108 A1 Dec. 31, 2020

Related U.S. Application Data

(63) Continuation of application No. 15/908,350, filed on Feb. 28, 2018, now Pat. No. 10,773,852.

(Continued)

(51) Int. Cl.
*B65D 1/16* (2006.01)
*B65D 6/34* (2006.01)
(Continued)

(52) U.S. Cl.
CPC .............. *B65D 11/22* (2013.01); *B25H 3/00* (2013.01); *B65D 1/165* (2013.01); *B65D 1/34* (2013.01);
(Continued)

(58) Field of Classification Search
CPC ...... B65D 1/16; B65D 25/24; B65D 25/2844; B65D 25/2867; B65D 25/287;
(Continued)

(56) References Cited

U.S. PATENT DOCUMENTS 143,959 A 10/1873 Brown
1,486,676 A 3/1924 Nilssen
(Continued)

FOREIGN PATENT DOCUMENTS

CN 102849303 A 1/2013
CN 203186671 U 9/2013
(Continued)

OTHER PUBLICATIONS

"Custom Leathercraft 1118 30-Pocket Outside Bucket-Pockets," published prior to Mar. 23, 2017, retrieved from https://www.walmart.com/ip/Custom-Leathercraft-1118-30-Pocket-Outside-Bucket-Pockets/19656756?action=product interest&action_type=title&beacon_version=1.0.2&bucket_id=irsbucketdefault&client_guid=62111ea2-f303-4793-8529-5a53e4d809c9&config_id=2&cu#about-item on Jun. 5, 2017.

(Continued)

*Primary Examiner* — Mollie Impink
(74) *Attorney, Agent, or Firm* — Banner & Witcoff, Ltd.

(57) ABSTRACT

A portable container and container assembly provides a durable, functional and simple carry-all solution for dry and wet provisions, goods and gear. Exemplary features of various embodiments include one or more of an overmolded pad on the bottom of the container, a removable handle incorporating a releasable retaining structure, a lid that seals within the container cavity and is flush with the outer periphery of the container sidewall and/or has a cellular internal reinforcing structure, a skirt extending around the sidewall that is integral with handle mounts for the handle and/or provides a connection point for external components, and a drop-in tray with a collapsible handle.

16 Claims, 11 Drawing Sheets

Related U.S. Application Data

(60) Provisional application No. 62/464,890, filed on Feb. 28, 2017.

(51) Int. Cl.

| | | |
|---|---|---|
| *B65D 5/46* | (2006.01) | |
| *B65D 43/02* | (2006.01) | |
| *B65D 1/34* | (2006.01) | |
| *B65D 1/42* | (2006.01) | |
| *B65D 25/24* | (2006.01) | |
| *B65D 25/28* | (2006.01) | |
| *B65D 77/04* | (2006.01) | |
| *F16B 21/18* | (2006.01) | |
| *B25H 3/00* | (2006.01) | |
| *B65D 25/32* | (2006.01) | |
| *B65D 25/34* | (2006.01) | |

(52) U.S. Cl.
CPC ........... *B65D 1/42* (2013.01); *B65D 5/46072* (2013.01); *B65D 25/24* (2013.01); *B65D 25/287* (2013.01); *B65D 25/32* (2013.01); *B65D 25/34* (2013.01); *B65D 43/022* (2013.01); *B65D 43/0202* (2013.01); *B65D 77/046* (2013.01); *F16B 21/18* (2013.01); *B65D 2525/285* (2013.01)

(58) Field of Classification Search
CPC ............ B65D 25/2873; B65D 25/2891; B65D 25/2894; B65D 25/32; B65D 77/046; B65D 81/2302; B65D 2525/285; B65D 25/20; F16B 21/18; F16B 21/183; F16B 21/186; Y10T 24/44769; Y10T 24/44872; A45C 2013/223
USPC ........................................................ 220/754
See application file for complete search history.

(56) References Cited

U.S. PATENT DOCUMENTS

| | | |
|---|---|---|
| 1,611,567 A | 12/1926 | Sonen |
| 1,781,583 A | 11/1930 | Hodgson |
| 2,018,271 A | 10/1935 | Samuel |
| 2,448,894 A | 9/1948 | Laus |
| D165,621 S | 1/1952 | West |
| 2,757,405 A | 8/1956 | Edwards |
| 3,387,650 A | 6/1968 | Hoffman et al. |
| 3,425,471 A | 2/1969 | Yates |
| 3,471,186 A | 10/1969 | Luebbert et al. |
| 3,504,817 A * | 4/1970 | Heider ............... B65D 41/0407 215/232 |
| 3,535,382 A | 10/1970 | Wilson |
| 3,586,200 A * | 6/1971 | Kramer ............... B65D 25/32 220/755 |
| 4,293,073 A * | 10/1981 | Yates, Jr. ............... B65D 25/32 206/519 |
| 4,356,930 A | 11/1982 | Roper |
| 4,524,882 A | 6/1985 | Buc |
| 4,541,540 A | 9/1985 | Gretz et al. |
| D289,455 S | 4/1987 | Freiler |
| 4,667,843 A | 5/1987 | Galer |
| D296,525 S | 7/1988 | Siegel |
| 4,765,472 A | 8/1988 | Dent |
| 4,767,015 A | 8/1988 | Ho |
| 4,887,735 A | 12/1989 | Illingworth |
| 4,890,355 A | 1/1990 | Schulten |
| D306,272 S | 2/1990 | Kruger |
| 4,911,295 A | 3/1990 | Venegoni |
| D307,342 S | 4/1990 | Giallourakis |
| 4,993,551 A | 2/1991 | Lindsay |
| 5,048,996 A | 9/1991 | DuBois et al. |
| 5,152,555 A | 10/1992 | Szabo |
| 5,158,193 A | 10/1992 | Chen |
| 5,174,447 A | 12/1992 | Fleming |
| 5,238,135 A | 8/1993 | Landis |
| 5,255,816 A | 10/1993 | Trepp |
| D345,237 S | 3/1994 | Stein |
| D352,143 S | 11/1994 | Arshinoff |
| 5,364,148 A | 11/1994 | Bartocci |
| D354,596 S | 1/1995 | Dancyger |
| D355,062 S | 1/1995 | Maire et al. |
| D355,735 S | 2/1995 | Shaffer et al. |
| 5,411,307 A | 5/1995 | Roberts |
| 5,429,265 A | 7/1995 | Maire et al. |
| D362,181 S | 9/1995 | Meyers et al. |
| D365,506 S | 12/1995 | Spitere |
| D371,185 S | 6/1996 | Mullins |
| D376,454 S | 12/1996 | Fierek et al. |
| D386,341 S | 11/1997 | Walker |
| D389,058 S | 1/1998 | Landis |
| 5,704,496 A | 1/1998 | Latta |
| 5,730,309 A | 3/1998 | Jiradejnunt et al. |
| 5,738,401 A | 4/1998 | Fan |
| 5,772,066 A | 6/1998 | Reynolds |
| D396,912 S | 8/1998 | Maire et al. |
| 5,816,439 A | 10/1998 | Lovell et al. |
| 5,833,095 A | 11/1998 | Russell et al. |
| 5,833,096 A | 11/1998 | Ohu |
| D402,986 S | 12/1998 | Doak |
| 5,860,559 A | 1/1999 | Wang |
| 5,873,482 A | 2/1999 | Conti |
| 5,883,095 A | 3/1999 | Granstrom et al. |
| 5,921,017 A | 7/1999 | Clark et al. |
| D414,337 S | 9/1999 | Hubert |
| 5,971,200 A | 10/1999 | Reynolds |
| D425,600 S | 5/2000 | Pas et al. |
| 6,059,109 A | 5/2000 | Stein |
| 6,085,902 A | 7/2000 | Fang |
| 6,151,910 A | 11/2000 | Hazen |
| 6,189,697 B1 | 2/2001 | Davis |
| 6,257,440 B1 | 7/2001 | Perkins et al. |
| D446,617 S | 8/2001 | Urbanski |
| 6,315,310 B1 | 11/2001 | Hurt |
| 6,336,255 B1 | 1/2002 | Gallup |
| D454,812 S | 3/2002 | Luk |
| 6,533,227 B1 | 3/2003 | Rom |
| 6,536,590 B1 | 3/2003 | Godshaw et al. |
| D475,851 S | 6/2003 | Leighton |
| 6,688,483 B2 | 2/2004 | Davis |
| 6,823,562 B1 | 11/2004 | Smith et al. |
| 6,926,165 B2 | 8/2005 | Conti |
| 6,938,761 B2 | 9/2005 | Nish |
| 6,964,348 B2 | 11/2005 | Breimon et al. |
| 7,073,205 B2 | 7/2006 | Finn |
| 7,090,088 B2 | 8/2006 | von Holdt, Jr. |
| 7,195,119 B2 | 3/2007 | Lungo |
| 7,207,457 B2 | 4/2007 | Schwarz |
| 7,232,169 B2 | 6/2007 | Porter |
| 7,305,793 B1 | 12/2007 | Macdonald |
| 7,380,796 B1 | 6/2008 | Hinton |
| D590,561 S | 4/2009 | Baltz |
| 7,805,813 B1 | 10/2010 | Bunyard |
| 7,980,415 B2 | 7/2011 | Crawley |
| D649,726 S | 11/2011 | Manuel |
| 8,079,768 B1 | 12/2011 | McLaughlin |
| 8,162,165 B2 | 4/2012 | Reed |
| 8,181,819 B2 | 5/2012 | Burney et al. |
| 8,210,391 B2 | 7/2012 | Luburic |
| 8,251,269 B2 | 8/2012 | Winneur |
| 8,308,010 B2 | 11/2012 | Letica et al. |
| 8,342,350 B2 | 1/2013 | Jain |
| D677,895 S | 3/2013 | Camp, III |
| D683,510 S | 5/2013 | Schick |
| 8,459,486 B2 | 6/2013 | Luburic et al. |
| D688,592 S | 8/2013 | Placencia |
| 8,615,921 B1 | 12/2013 | Weems |
| D698,939 S | 2/2014 | Wainwright et al. |
| 8,662,300 B1 | 3/2014 | Arena |
| 8,714,403 B2 | 5/2014 | Amprimo |
| 8,806,803 B1 | 8/2014 | Mitchell et al. |
| 8,844,717 B1 | 9/2014 | Ross |
| 8,863,982 B2 | 10/2014 | Baltz et al. |

(56) References Cited

U.S. PATENT DOCUMENTS

| | | |
|---|---|---|
| 8,863,983 B2 | 10/2014 | Meers et al. |
| 8,869,985 B2 | 10/2014 | Schick |
| D722,833 S | 2/2015 | Miller |
| 8,978,194 B1 | 3/2015 | Lentine |
| D728,882 S | 5/2015 | Tsai |
| 9,067,462 B1 | 6/2015 | Pressler et al. |
| D739,510 S | 9/2015 | Bullock |
| D772,561 S | 11/2016 | Polunsky et al. |
| 9,533,789 B2 | 1/2017 | Selina et al. |
| 2002/0003098 A1 | 1/2002 | Bell |
| 2002/0088729 A1 | 7/2002 | Urbanski |
| 2004/0045084 A1 | 3/2004 | Klosterman |
| 2005/0051441 A1 | 3/2005 | Lamar |
| 2005/0056557 A1 | 3/2005 | Jennings et al. |
| 2005/0133521 A1 | 6/2005 | Schwarz |
| 2005/0279654 A1 | 12/2005 | Robles |
| 2006/0011686 A1 | 1/2006 | Latham |
| 2006/0163894 A1 | 7/2006 | Mishek et al. |
| 2007/0246959 A1 | 10/2007 | Arcaro et al. |
| 2008/0105694 A1 | 5/2008 | Chen |
| 2009/0301912 A1 | 12/2009 | Cornell |
| 2010/0072215 A1 | 3/2010 | Coon |
| 2011/0000919 A1 | 1/2011 | Whalen |
| 2012/0085774 A1 | 4/2012 | Luburic et al. |
| 2012/0279976 A1 | 11/2012 | DeSanti et al. |
| 2013/0037559 A1 | 2/2013 | Fierek |
| 2013/0048657 A1 | 2/2013 | Heiser, Jr. et al. |
| 2013/0119078 A1 | 5/2013 | Cygan |
| 2013/0248284 A1 | 9/2013 | Nichols, Jr. |
| 2014/0102925 A1 | 4/2014 | Jacobson et al. |
| 2014/0124520 A1 | 5/2014 | Allan |
| 2014/0217095 A1 | 8/2014 | Scivoletto |
| 2014/0261933 A1 | 9/2014 | Jones |
| 2014/0326189 A1 | 11/2014 | Jain |
| 2015/0001121 A1 | 1/2015 | Pietruch et al. |
| 2015/0053705 A1 | 2/2015 | Wilson et al. |
| 2015/0107149 A1 | 4/2015 | Garrett |
| 2015/0217903 A1 | 8/2015 | Mazyck, III |
| 2015/0225125 A1 | 8/2015 | Martinisko |
| 2016/0120162 A1 | 5/2016 | Copper |
| 2016/0228756 A1 | 8/2016 | Siscoe |
| 2016/0280423 A1 | 9/2016 | Luburic |
| 2016/0311584 A1 | 10/2016 | Van Oosten |
| 2016/0368133 A1 | 12/2016 | Welfel et al. |
| 2016/0368665 A1 | 12/2016 | Leeming |
| 2017/0229687 A1 | 8/2017 | Elison et al. |
| 2017/0259424 A1 | 9/2017 | Vetter et al. |
| 2018/0079555 A1 | 3/2018 | Lee, Jr. |
| 2018/0244432 A1 | 8/2018 | Seiders et al. |

FOREIGN PATENT DOCUMENTS

| | | |
|---|---|---|
| CN | 103662246 A | 3/2014 |
| CN | 303149621 | 4/2015 |
| CN | 303214602 | 5/2015 |
| CN | 303245878 | 6/2015 |
| CN | 303263716 | 7/2015 |
| CN | 303284668 | 7/2015 |
| CN | 303284683 | 7/2015 |
| CN | 303295744 | 7/2015 |
| CN | 303295746 | 7/2015 |
| CN | 303316701 | 8/2015 |
| CN | 303316702 | 8/2015 |
| CN | 303316749 | 8/2015 |
| CN | 303316750 | 8/2015 |
| CN | 303316751 | 8/2015 |
| CN | 303336476 | 8/2015 |
| CN | 303345543 | 8/2015 |
| CN | 303517355 | 12/2015 |
| CN | 303899235 | 10/2016 |
| CN | 303910969 | 11/2016 |
| DE | 202009009198 U1 | 11/2009 |
| DE | 202013100609 U1 | 10/2013 |
| DE | 20201320100609 U1 | 11/2013 |
| EP | 779018 A | 7/1957 |
| EP | 2130777 A2 | 12/2009 |
| GB | 201689 A | 8/1923 |
| GB | 2499688 A | 8/2013 |
| JP | 3116035 U | 11/2005 |
| KR | 200472092 Y1 | 4/2014 |
| WO | WO-2006009537 A1 * | 1/2006 ......... A47G 23/0225 |

OTHER PUBLICATIONS

"Fiskars Garden Bucket Caddy, Bucket Not Included (9424)," published prior to Mar. 23, 2017, retrieved from https://www.amazon.com/Fiskars-Garden-Bucket-Caddy-Included/dp/B00005YX30 on Jun. 5, 2017.

"Walmart Bucket Organizers" published prior to Mar. 23, 2017, retrieved from <https://www.walmart.com/search/?query=Bucket%20Organizers&u1=&oid=223073.1&wmlspartner=TQiP6m79tRs&sourceid=06586858561623118499&affillinktype=10& veh=aff> on Apr. 7, 2017.

"Utility Pail 5 Gallon By Seachoice Products," published prior to Feb. 27, 2017, retrieved from https://www.amazon.com/Utility-Pail-Gallon-Seachoice-Products/dp/B002IZFOGK/ref=sr_1_79?ie=UTF8&qid=1483581180&sr=8-79&keywords=utility+pail on Jun. 8, 2017.

"United Solutions PN0020 White Five Gallon Plastic Industrial Pail—5 Gallon Plastic Bucket for Industrial in White," published prior to Feb. 27, 2017, retrieved from https://www.amazon.com/United-Solutions-PN0020-Plastic-Industrial/dp/B005SB1ORY/ref=sr_1_88?ie=UTF8&qid=1483581247&sr=8-88&keywords=utility+pail on Jun. 8, 2017.

"Bucket Stacker Tool Organize with 4 Compartments, 3" Deep," published prior to Feb. 27, 2017, retrieved from http://www.all-spec.com/Catalog/Hand-Power-Tools/Pneumatic-Tools/Tool-Arms-Holders/15051-65685?gclid=Clrk0-h0qtECFUhWDQod6w4JOg on Jun. 8, 2017.

"Built-in Bottom Handle 5 Gallon Buckets & Covers," published prior to Feb. 27, 2017, retrieved from http://www.usplastic.com/catalog/item.aspx?itemid=118844&catid=752 on Jun. 8, 2017.

"The Ultimate Bucket," published prior to Feb. 27, 2017, retrieved from https://web.archive.org/web/20111027180918/http://ultimatebucket.com:80/index.html on Jun. 21, 2017.

"61—Pocket In and Out Bucket Organizer," published prior to this application's filing date on Mar. 23, 2017, retrieved from https://www.walmart.com/ip/Custom-Leathercraft-4122-61-Pocket-Bucket-Tool-Bag-61-Pocket-In-Out-Each/21659694 on Jun. 5, 2017.

"Apollo Tools Bucket Organizer, Pink," published prior to this application's filing date on Mar. 23, 2017, retrieved from https://www.walmart.com/ip/Apollo-Tools-Bucket-Organizer/22848213 on Jun. 5, 2017.

"Apollo Tools Bucket Organizer," published prior to this application's filing date on Mar. 23, 2017, retrieved from https://www.walmart.com/ip/Apollo-Tools-Bucket-Organizer/22848212 on Jun. 5, 2017.

"Bucket Organizer Wrap Milwaukee Tool Holders 48-22-8175045242479580," published prior to this application's filing date on Mar. 23, 2017, retrieved from https://www.walmart.com/ip/Bucket-Organizer-Wrap-Milwaukee-Tool-Holders-48-22-8175-045242479580/120876362 on Jun. 5, 2017.

"Fiskars Garden Bucket Caddy, Bucket Not Included (9424)," published prior to this application's filing date on Mar. 23, 2017, retrieved from https://www.amazon.com/Fiskars-Garden-Bucket-Caddy-Included/dp/B00005YX30 on Jun. 5, 2017.

Jan. 20, 2022—(WO) International Search Report & Written Opinion—PCT/US21/044477.

* cited by examiner

PORTABLE CONTAINER AND CONTAINER ASSEMBLY

CROSS-REFERENCE TO RELATED APPLICATIONS

This application is a continuation of co-pending U.S. patent application Ser. No. 15/908,350, filed Feb. 28, 2018, which claims priority to U.S. Provisional Application No. 62/464,890, filed Feb. 28, 2017, which prior applications are incorporated herein in their entireties.

TECHNICAL FIELD

Aspects of the disclosure herein are related to portable containers and container assemblies, such as a five-gallon bucket or pail, and in particular, to a portable container assembly having various features such as fixed or removable handles, a removable tray, a limited slip base, and a sealing lid.

BACKGROUND

Plastic five-gallon buckets, or pails, evolved from the early wooden and metal pails and grew in use in large part due to the popularity of plastic for food products, and the tendency of metal pails to rust. As is often the case with many generally inexpensive articles, other uses for these types of containers have developed, including being used as a carry-all solution for various goods and gear, such as tools and supplies, as well as provisions such as food items.

However, while an open-topped plastic pail may offer versatility for carrying almost anything that will fit inside, as the saying goes, "jack of all trades, master of none", such a container will be found wanting when more than mere portability is needed.

BRIEF SUMMARY

The present disclosure relates generally to portable container assemblies and components thereof, which include one or more of a container, a handle assembly, a lid, and/or a tray. Aspects of the disclosure relate to a portable container assembly that includes a container, a handle assembly, a lid, and a tray. The container has a circular bottom that includes a base having a central recess and a pad connected to a bottom side of the base, a sidewall connected to the base and extending upward from the base to define an internal cavity with an opening at a top of the sidewall, first and second handle mounts connected to the outer surface of the sidewall, and a skirt connected to the outer surface of the sidewall. The pad is annular and extends around the central recess, the base has ribs extending downward from the bottom side of the base, and the pad is formed from a flexible material that is overmolded onto the bottom side of the base, such that at least some of the ribs penetrate the pad and are covered by the flexible material. The sidewall includes a shoulder located above a mid-height of the sidewall and forming a horizontal ledge on the inner surface of the sidewall. The skirt has a horizontal skirt portion connected to the outer surface of the sidewall and extending outwardly from the outer surface and a vertical skirt portion connected to the horizontal skirt portion and extending downward from the horizontal skirt portion, where a plurality of ports are defined in the skirt and configured for connection to external components. The vertical skirt portion is spaced from the outer surface of the sidewall, such that the gap is further defined between the vertical skirt portion and the outer surface of the sidewall. The first and second handle mounts are integrally formed with the skirt and have a vertical connecting portion with a receptacle defined therein, with the vertical connecting portion being spaced from the sidewall to define a gap between the vertical connecting portion and the outer surface of the sidewall. The handle assembly includes a handle configured for use in lifting the container assembly and including an elongated piece of a flexible textile material, with first and second connection members connected to opposed ends of the handle. The first and second connection members are removably connected to the first and second handle mounts to removably connect the handle assembly to the container, and the first and second connection members are overmolded onto the opposed ends of the handle such that an overmolded material of the first and second connection members infiltrates between fibers of the flexible textile material. Additionally, each of the first and second connection members has a plug with a recess extending around the plug, where the plug of the first connection member is received within the receptacle of the first handle mount and the plug of the second connection member is received within the receptacle of the second handle mount. The handle assembly further includes first and second removable fastening members, where the first and second removable fastening members are engaged with the plugs of the first and second connection members within the recesses at locations within the gap to secure the plugs within the receptacles of the first and second handle mounts. The lid is removably connected to the top of the container to at least partially cover the opening and has a plurality of internal reinforcing members arranged in a honeycomb cellular structure. The lid further includes a lower portion received within the opening of the container and having a gasket engaging the inner surface of the sidewall when the lid is connected to the container and an upper portion having a larger peripheral dimension than the lower portion to create a stepped configuration, where the upper portion extends outwardly over the top of the sidewall, and an outer periphery of the upper portion is substantially flush with the outer surface at the top of the sidewall. The tray includes a tray body having an outer wall defining a tray cavity and one or more internal dividers forming compartments within the tray cavity, a horizontal lip extending outwardly from the outer wall, and a collapsible tray handle connected to the tray body. The collapsible tray handle is configured for collapsing in a sliding manner, such that the tray handle is moveable by sliding between at least a retracted position where the tray handle does not extend above the horizontal lip, and an extended position where the tray handle extends a greater distance upward from the tray body relative to the retracted position. The tray is received within the internal cavity of the container and the lip rests on the ledge to support the tray within the internal cavity, and the tray handle in the retracted position fits below the lid when the tray is received within the internal cavity and the lid is connected to the container. Various aspects of the disclosure relate to each of these components individually and/or an assembly including any combination of such components.

Additional aspects of the disclosure relate to portable container assembly that includes a container, as well as a lid and a tray configured to be engaged with the container. The container has a bottom and a sidewall connected to the bottom and extending upward from the bottom to define an internal cavity with an opening at a top of the sidewall, with the sidewall having an inner surface and an outer surface. The lid is removably connected to the top of the container to at least partially cover the opening. The tray has a tray body defining a tray cavity and a collapsible tray handle connected to the tray body, such that the tray handle is moveable between at least a retracted position and an extended position where the tray handle extends a greater distance upward from the tray body relative to the retracted position. The tray is received within the internal cavity of the container, and the tray handle in the retracted position fits below the lid when the tray is received within the internal cavity and the lid is connected to the container. The tray handle may be configured for moving between the extended and retracted positions in a sliding manner in one configuration.

According to one aspect, the sidewall includes a shoulder forming a ledge on the inner surface of the sidewall, and the tray body has an outer wall defining the tray cavity and a lip extending outwardly from the outer wall, such that the lip rests on the ledge to support the tray within the internal cavity.

According to another aspect, the tray further includes one or more internal dividers forming compartments within the tray cavity.

Further aspects of the disclosure relate to a tray for use with a portable container, which includes a tray body having an outer wall defining a tray cavity, a lip extending outwardly from the outer wall, and a collapsible tray handle connected to the tray body. The horizontal lip defines a maximum peripheral dimension of the tray, and the lip is configured to rest on a ledge of the portable container to support the tray within an internal cavity of the portable container. The tray handle is moveable between at least a retracted position where the tray handle does not extend above the lip, and an extended position where the tray handle extends a greater distance upward from the tray body relative to the retracted position. The tray handle may be configured for moving between the extended and retracted positions in a sliding manner in one configuration.

According to one aspect, the tray may further include one or more internal dividers forming compartments within the tray cavity.

According to another aspect, the tray body and the lip may have circular peripheral shapes.

According to a further aspect, the lip is positioned at a top end of the outer wall.

According to yet another aspect, the lip extends outwardly (e.g., horizontally) around an entire periphery of the tray body.

Still further aspects of the disclosure relate to a portable container assembly including a container that has a bottom and a sidewall connected to the bottom and extending upward from the bottom to define an internal cavity with an opening at a top of the sidewall, and a lid removably connected to the top of the sidewall to at least partially cover the opening. The lid further includes a lower portion received within the opening of the container and having a gasket engaging the inner surface of the sidewall when the lid is connected to the container and an upper portion having a larger peripheral dimension than the lower portion to create a stepped configuration, such that the upper portion extends outwardly over the top of the sidewall, and such that an outer periphery of the upper portion is substantially flush with the outer surface at the top of the sidewall.

According to one aspect, the upper portion includes a grasping tab extending outward from the outer periphery and further extending outward of the outer surface of the sidewall at the top of the sidewall when the lid is connected to the container.

According to another aspect, the container has a rim extending outward at the top of the sidewall, and the outer periphery of the upper portion is substantially flush with the outer surface of the rim.

According to a further aspect, the lid comprises a top wall and a bottom wall with a space defined between the top and bottom walls, the lid further having a plurality of internal reinforcing members extending between the top and bottom walls and arranged in a cellular structure. In one configuration, the cellular structure is a honeycomb structure.

According to yet another aspect, the bottom, the sidewall, and the lid all have circular peripheral shapes.

Other aspects of the disclosure relate to a portable container assembly that includes a container having a bottom, a sidewall connected to the bottom and extending upward from the bottom to define an internal cavity with an opening at a top of the sidewall, and a skirt connected to the outer surface of the sidewall. The skirt has a horizontal skirt portion connected to the outer surface of the sidewall and extending outwardly from the outer surface and a vertical skirt portion connected to the horizontal skirt portion and extending downward from the horizontal skirt portion. The vertical skirt portion is spaced from the outer surface of the sidewall, such that a gap is defined between the vertical skirt portion and the outer surface of the sidewall, and a plurality of ports are defined in both the horizontal skirt portion and the vertical skirt portion and configured for connection to external components.

According to one aspect, the container further has first and second handle mounts connected to the outer surface of the sidewall, each of the first and second handle mounts having a vertical connecting portion with a receptacle defined therein. In one configuration, the first and second handle mounts are integrally formed with the skirt, and the vertical connecting portion is spaced from the sidewall, such that the gap is further defined between the vertical connecting portion and the outer surface of the sidewall. The assembly may further include a handle assembly having a handle configured for use in lifting the container assembly and first and second connection members connected to opposed ends of the handle, where the first and second connection members are removably connected to the first and second handle mounts to removably connect the handle assembly to the container. In one configuration, the first and second connection members are overmolded onto the opposed ends of the handle, and each of the first and second connection members includes a plug, where the plug of the first connection member is received within the receptacle of the first handle mount and the plug of the second connection member is received within the receptacle of the second handle mount.

Other aspects of the disclosure relate to a portable container assembly that includes a container and a handle assembly comprising a handle configured for use in lifting the container assembly. The container includes a bottom, a sidewall connected to the bottom and extending upward from the bottom to define an internal cavity with an opening at a top of the sidewall, and first and second handle mounts connected to the outer surface of the sidewall, each of the first and second handle mounts having a vertical connecting portion with a receptacle defined therein, the vertical connecting portion being spaced from the sidewall to define a gap between the vertical connecting portion and the outer surface of the sidewall. The handle assembly includes first and second connection members connected to opposed ends of the handle, where the first and second connection members are removably connected to the first and second handle mounts to removably connect the handle assembly to the container. Each the first and second connection members has a plug, such that the plug of the first connection member is received within the receptacle of the first handle mount and the plug of the second connection member is received within the receptacle of the second handle mount. The handle assembly further includes first and second removable fastening members, where the first and second removable fastening members are engaged with the plugs of the first and second connection members within the recesses at locations within the gap to secure the plugs within the receptacles of the first and second handle mounts.

According to one aspect, each of the first and second connection members further includes a recess extending around the plug, and wherein the first and second removable fastening members are engaged with the plugs of the first and second connection members within the recesses to secure the plugs within the receptacles of the first and second handle mounts. In one configuration, the first and second removable fastening members each include a grip portion configured for manipulation by a user and a pair of bowed legs extending from the grip portion, where a slot is defined between the legs. The first and second removable fastening members are engaged with the plugs of the first and second connection members such that the plug of the first connection member is received within the slot of the first removable fastening member and the legs of the first removable fastening member are received in the recess of the first connection member on opposite sides of the plug, and such that the plug of the second connection member is received within the slot of the second removable fastening member and the legs of the second removable fastening member are received in the recess of the second connection member on opposite sides of the plug.

According to another aspect, the first and second removable fastening members each include a grip portion configured for manipulation by a user and a pair of bowed legs extending from the grip portion, where a slot is defined between the legs. The first and second removable fastening members are engaged with the plugs of the first and second connection members such that the plug of the first connection member is received within the slot of the first removable fastening member and the legs of the first removable fastening member are positioned on opposite sides of the plug of the first connection member, and such that the plug of the second connection member is received within the slot of the second removable fastening member and the legs of the second removable fastening member are positioned on opposite sides of the plug of the second connection member.

According to a further aspect, the first and second connection members are overmolded onto the opposed ends of the handle. In one configuration, the handle includes an elongated piece of a flexible textile material, and the first and second connection members are overmolded onto the opposed ends of the handle such that an overmolded material of the first and second connection members infiltrates between fibers of the flexible textile material.

Other aspects of the disclosure relate to a portable container assembly that includes a container and a handle assembly having a handle configured for use in lifting the container assembly and a first connection member connected to the handle. The container has a bottom, a sidewall connected to the bottom and extending upward from the bottom to define an internal cavity with an opening at a top of the sidewall, and a first handle mount connected to the outer surface of the sidewall. The first connection member is removably connected to the first handle mount to removably connect the handle assembly to the container, and the first connection member is overmolded onto a first end of the handle.

According to one aspect, the container further includes a second handle mount connected to the outer surface of the sidewall, and the handle assembly further includes a second connection member overmolded onto a second end of the handle. The second connection member is removably connected to the second handle mount to removably connect the handle assembly to the container, and the second connection member is overmolded onto a second end of the handle. In one configuration, the first and second ends of the handle are opposed ends of the handle. In another configuration, each of the first and second handle mounts has a receptacle defined therein, and each of the first and second connection members includes a plug, such that the plug of the first connection member is received within the receptacle of the first handle mount and the plug of the second connection member is received within the receptacle of the second handle mount. The handle assembly in this configuration may also include first and second removable fastening members, where the first and second removable fastening members are engaged with the plugs of the first and second connection members to secure the plugs within the receptacles of the first and second handle mounts. Each the first and second connection members in this configuration may further have a recess extending around the plug, with each of the first and second handle mounts having a vertical connecting portion with a receptacle defined therein, the vertical connecting portion being spaced from the sidewall to define a gap between the vertical connecting portion and the outer surface of the sidewall, such that the first and second removable fastening members are engaged with the plugs of the first and second connection members within the recesses at locations within the gap to secure the plugs within the receptacles of the first and second handle mounts. Additionally, the handle in this configuration may include an elongated piece of a flexible textile material, where the first and second connection members are overmolded onto the first and second ends of the handle such that an overmolded material of the first and second connection members infiltrates between fibers of the flexible textile material.

According to another aspect, the first handle mount has a vertical connecting portion with a receptacle defined therein, the vertical connecting portion being spaced from the sidewall to define a gap between the vertical connecting portion and the outer surface of the sidewall.

According to a further aspect, the first connection member includes a plug, and the plug of the first connection member is received within a receptacle defined in the first handle mount. In one configuration, the handle assembly further includes a first removable fastening member, where the first removable fastening member is engaged with the plug of the first connection member to secure the plug within the receptacle of the first handle mount. The first connection member in this configuration may also include a recess extending around the plug, where the first removable fastening member is engaged with the plug of the first connection member within the recess to secure the plug within the receptacle of the first handle mount. The first handle mount in this configuration may further have a vertical connecting portion with the receptacle defined therein, the vertical connecting portion being spaced from the sidewall to define a gap between the vertical connecting portion and the outer surface of the sidewall, where the first removable fastening member is engaged with the plug of the first connection member within the recess at a location within the gap to secure the plugs within the receptacle of the first handle mount. Additionally, the first removable fastening member in this configuration may include a grip portion configured for manipulation by a user and a pair of bowed legs extending from the grip portion, where a slot is defined between the legs, and where the first removable fastening member is engaged with the plug of the first connection member such that the plug is received within the slot and the legs are received in the recess on opposite sides of the plug.

According to yet another aspect, the handle includes an elongated piece of a flexible textile material, and the first connection member is overmolded onto the first end of the handle such that an overmolded material of the first connection member infiltrates between fibers of the flexible textile material.

Other aspects of the disclosure relate to a handle assembly for use with a portable container, including a handle configured for use in lifting the container assembly and first and second connection members connected to opposed ends of the handle. The handle includes an elongated piece of a flexible textile material. Each of the first and second connection members has a base body connected to one of the ends of the handle and a plug extending from the base body, where the plugs of the first and second connection members are configured for removable connection to handle mounts on the container to removably connect the handle assembly to the container. The base bodies of the first and second connection members are overmolded onto the opposed ends of the handle such that an overmolded material of each base body infiltrates between fibers of the flexible textile material.

According to one aspect, the plug of each of the first and second connection members has a recess extending around the plug, and the handle assembly also includes first and second removable fastening members, where the first and second removable fastening members are engaged with the plugs of the first and second connection members within the recesses and are configured to secure the plugs in connection with the handle mounts of the container. In one configuration, the first and second removable fastening members each have a grip portion configured for manipulation by a user and a pair of bowed legs extending from the grip portion, and a slot is defined between the legs. In this configuration, the first and second removable fastening members are engaged with the plugs of the first and second connection members such that the plug of the first connection member is received within the slot of the first removable fastening member and the legs of the first removable fastening member is received in the recess of the first connection member on opposite sides of the plug, and the plug of the second connection member is received within the slot of the second removable fastening member and the legs of the second removable fastening member is received in the recess of the second connection member on opposite sides of the plug.

Other aspects of the disclosure relate to a portable container assembly that includes a container having a bottom with a base and a pad connected to a bottom side of the base, and a sidewall connected to the base and extending upward from the base to define an internal cavity with an opening at a top of the sidewall. The base has at least one rib extending downward from the bottom side of the base, where the pad is formed from a flexible material that is overmolded onto the bottom side of the base, such that the at least one rib penetrates the pad and is covered by the flexible material.

According to one aspect, the base further has a plurality of ribs extending downward from the bottom side of the base, and at least some of the ribs penetrate the pad and are covered by the flexible material.

According to another aspect, the base has a central recess, and the pad extends around the central recess. In one configuration, the base is circular in shape, and the pad is annular in shape. In this configuration, the at least one rib may be arranged in an annular arrangement.

According to a further aspect, the base also includes a channel extending around an outer portion of the base, and the pad is at least partially received within the channel Yet further aspects of the disclosure relate to combinations of features and aspects described above, including any combination thereof, as well as a portable container including any combination of the features and aspects described above as components thereof.

Still other features and advantages of the invention will be apparent from the following specification taken in conjunction with the following drawings.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various examples and components of this disclosure, reference is made to the accompanying drawings, which form a part hereof, and in which are shown by way of illustration various example structures and environments in which aspects of the disclosure may be practiced. It is to be understood that other structures and environments may be utilized and that structural and functional modifications may be made from the specifically described structures and methods without departing from the scope of the present disclosure.

Figure 1:
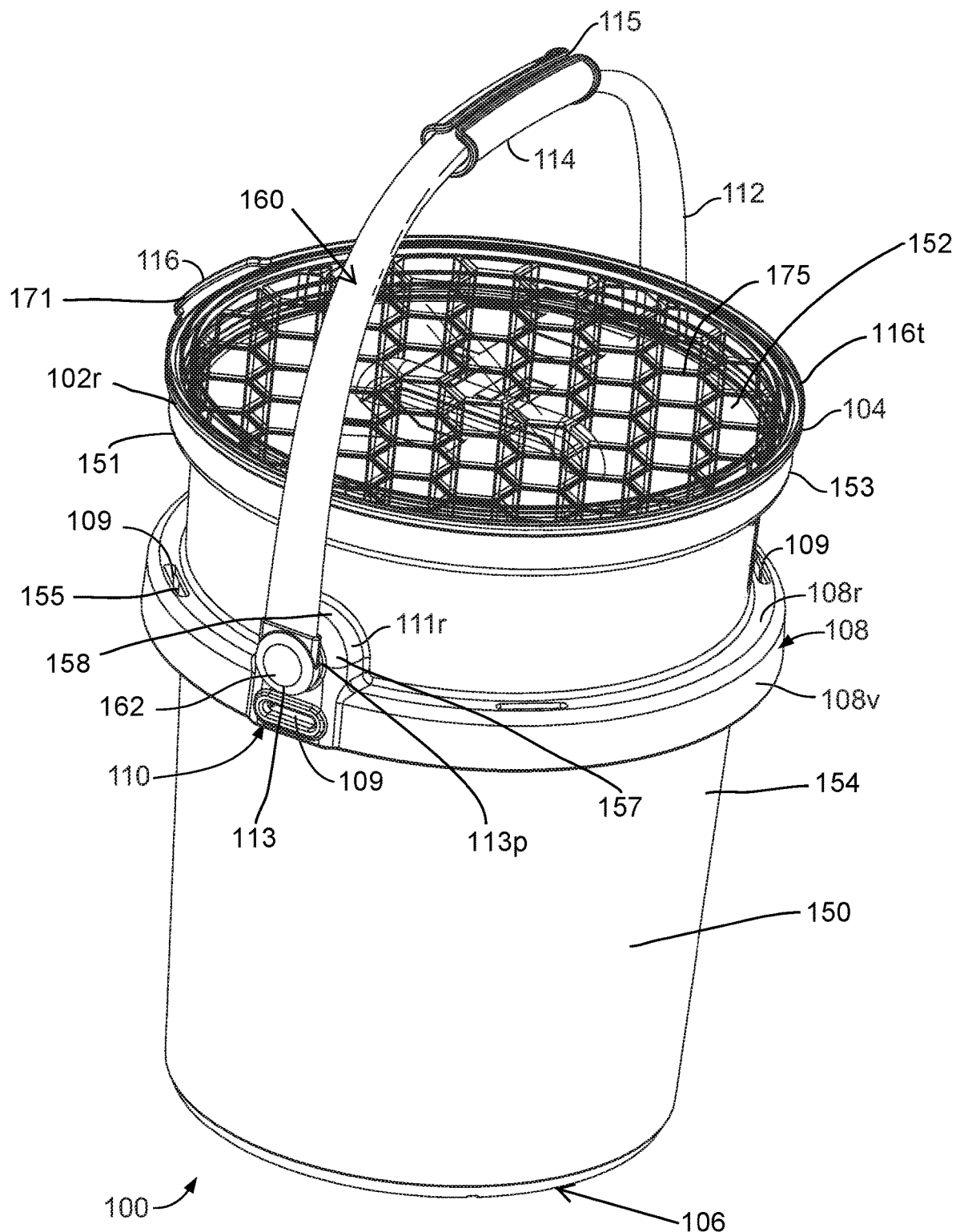
FIG. 1 is a perspective view of one embodiment of a portable container assembly in accordance with aspects of the disclosure.
Figure 2:
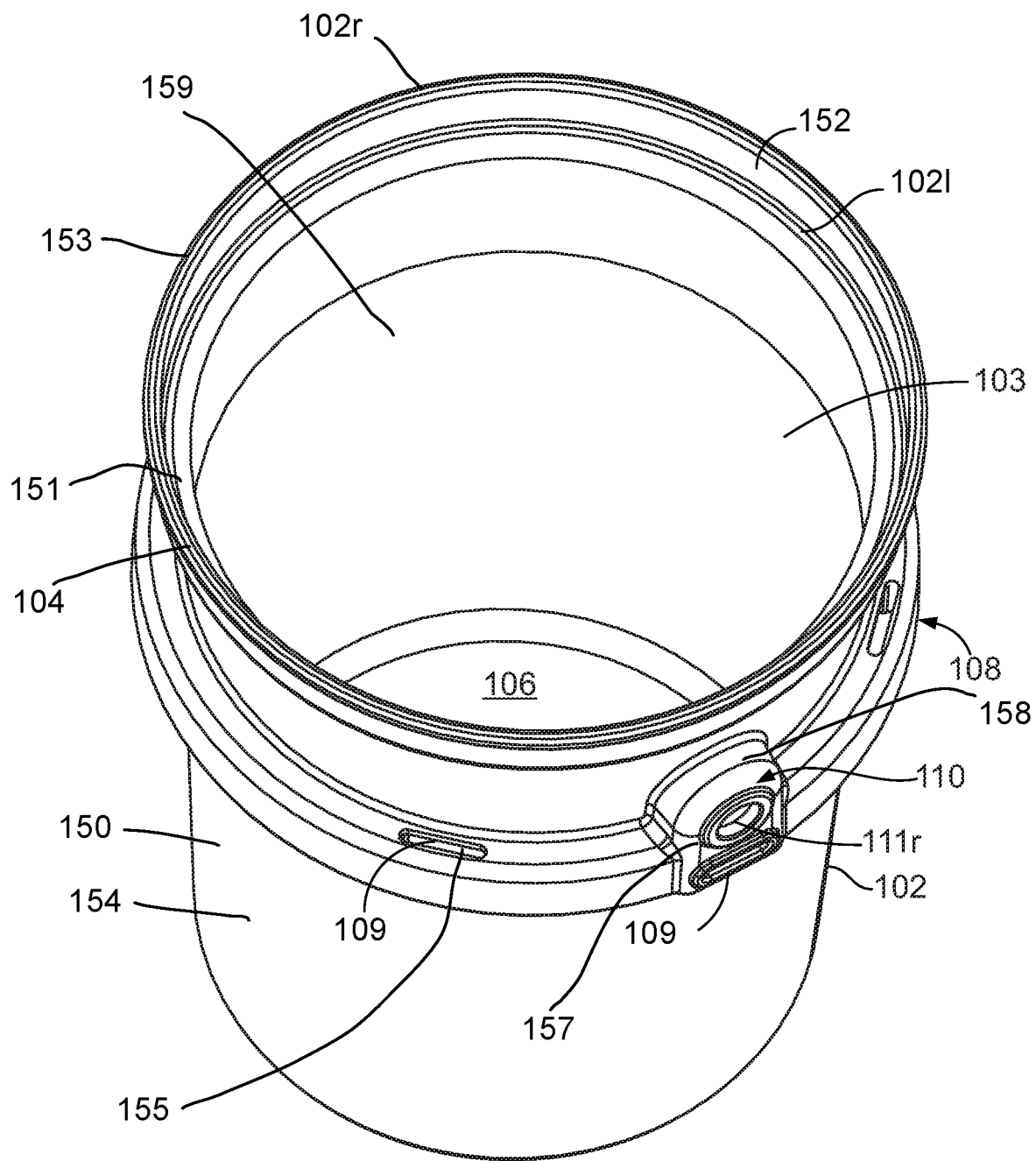
FIG. 2 is an upper perspective view of the assembly of FIG. 1 with a lid and a removable handle removed.

Referring to FIG. 1, a portable container assembly 100 in accordance with exemplary embodiments described herein may include a container 102, which can be in the form of a substantially cylindrical structure, such as a tapered cylinder, which is closed at the bottom and open at the top. Also, so as to enable storage and transportation of provisions, such as food items for human consumption, this structure 102 can be formed of a food grade plastic.

The container 102 includes a bottom 106 that includes a base 141 having a central recess 142, and a pad 120 connected to a bottom side 140 of the base 141. The central recess 142 may include one or more bracing structures 145 for increased strength. In the embodiment shown in FIGS. 1-5, the pad 120 extends around the central recess 142, and the recess 142 is circular, while the pad 120 is annular in shape. The container 102 also includes a sidewall 150 connected to the bottom 106 and/or the base 141 and extending upward from the base 141 to define an internal cavity 103 with an opening 152 at a top 153 of the sidewall 150. The bottom 106 of the container 102 is circular and defined by a circular base 141 and a circular sidewall 150, with other circular, cylindrical, or annular components as shown in FIGS. 1-10, although the container 102 and the components thereof may be shaped differently in other embodiments, including oval/elliptical or various polygonal shapes.

The top 104 of the container 102 is open, and the top 153 of the sidewall 150 has an outer rim 102r extending outwardly in one embodiment, as shown in FIGS. 1-5. Also included in the embodiment of the container assembly 100 shown in FIGS. 1-10 are a skirt 108 attached to the outer surface 154 of the sidewall 150, a lid 116, a handle assembly 160 that includes a handle 112 and two connection members 113, two handle mounts 110 attached to the sidewall 150, and a drop-in tray 130. In one example, the base 141, the sidewall 150, the handle mounts 110, and the skirt 108 are integrally molded as a single piece. In another embodiment, various features of the container assembly 100 may be insulated, such as by using structures shown and described in U.S. Pat. No. 8,910,819, issued Dec. 16, 2014, and U.S. patent application Ser. No. 14/665,494, filed on Mar. 23, 2015, which are both incorporated herein by reference. For example, in one embodiment, at least the base 141, the sidewall 150, and the lid 116 are insulated.

Figure 3:
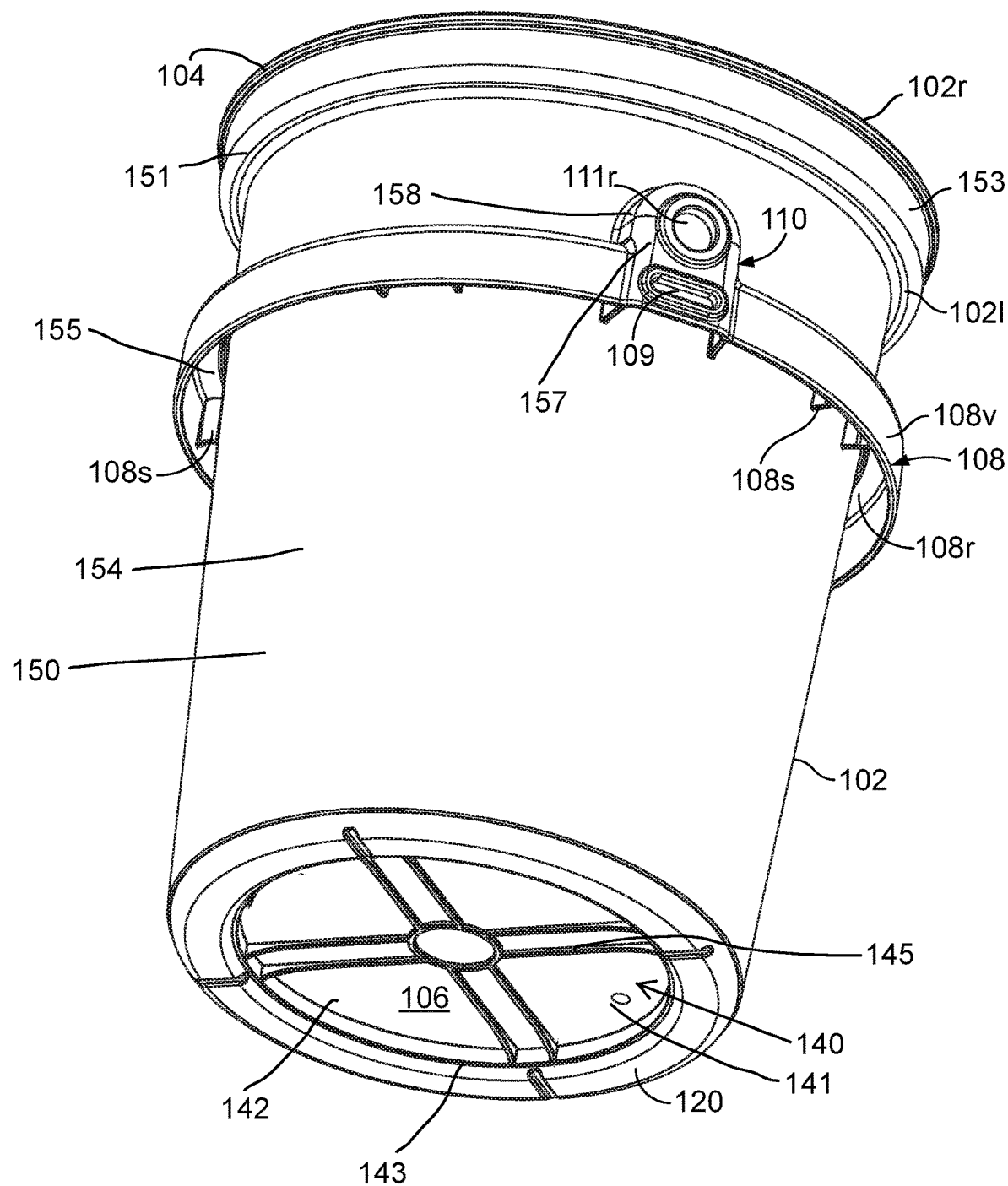
FIG. 3 is a lower perspective view of the assembly of FIG. 1 with the removable handle removed.

In the embodiment of FIGS. 1-5, the skirt 108 includes a horizontal and/or radially projecting portion 108r and a vertical portion 108v extending vertically or generally vertically downward from the periphery of the horizontal portion 108r. The vertical skirt portion 108v is spaced from the outer surface 154 of the sidewall 150, such that a gap 155 is defined between the vertical skirt portion 108v and the outer surface 154 of the sidewall 150. The skirt 108 may also include open ports or slots 109 configured for connection to external components, for example, for use as tie down, or anchoring, ports for securing the container 102 or securing an external component to the container. The skirt 108 in the embodiment of FIGS. 1-5 has ports 109 defined in the horizontal skirt portion 108r and distributed around the periphery of the container 102. As described below, the handle mounts 110 (which may be integral with the skirt 108) may also include ports 109. As shown in FIG. 3, the skirt 108 may further include support elements 108s to provide radial support for the skirt 108. These support elements 108s extend between the outer surface 154 of the sidewall 150 and the vertical skirt portion 108v to maintain rigidity and prevent deformation during use. The support elements 108s may also be connected to the horizontal skirt portion 108r to provide strength to the horizontal skirt portion 108r as well.

The container 102 includes one or more handle mounts 110 connected to the outer surface 154 of the sidewall 150, and the embodiment of FIGS. 1-7 includes two handle mounts 110 positioned on opposed sides of the container 102. Each handle mount 110 includes a receptacle 111r configured to receive a portion of the handle assembly 160 to connect the handle assembly 160 to the container 102. The receptacles 111r are in the form of apertures in one embodiment, but may be formed as a partially-open notch or other suitable structure in other embodiments. Each handle mount 110 in this embodiment has a vertical connecting portion 157 with a receptacle 111r defined therein, with the vertical connecting portion 157 extending vertically or generally vertically and being spaced from the sidewall 150 to define a gap 155 between the vertical connecting portion 157 and the outer surface 154 of the sidewall 150. The vertical connecting portion 157 of each handle mount 110 in the embodiment of FIGS. 1-6 has a port 109 therein for connection to external components, as described above. Each mount 110 also has a transverse portion 158 connected to the outer surface 154 of the sidewall 150 and extending outward from the sidewall 150 in the embodiment of FIGS. 1-6, such that the vertical connecting portion 157 is parallel or generally parallel to the sidewall 150 and the transverse portion 158 is transverse to the sidewall 150 and the vertical connecting portion 157. The vertical connecting portion 157 depends from the transverse portion 158 in this configuration. In the embodiment of FIGS. 1-6, the mounts 110 are integrally formed with the skirt 108, such that the transverse portion 158 of each of the mounts 110 is continuous with the horizontal skirt portion 108r and the vertical connecting portion 157 of each of the mounts 110 is continuous with the vertical skirt portion 108v. The transverse portion 158 in the embodiment of FIGS. 1-6 has an arched shape that arcs upward from the horizontal skirt portion 108r on both sides of the mount 110. Additionally, the lower portions of the transverse portion 158 in the embodiment of FIGS. 1-6 extend slightly outward of the vertical skirt portion 108v on both edges of the vertical connecting portion 157, such that the vertical connecting portion 157 is positioned slightly radially outward of the adjacent areas of the vertical skirt portion 108v. In this configuration, the gap 155 extends continuously between the skirt 108 and the sidewall 150 and between the mounting portions 110 and the sidewall 150.

Figure 4:
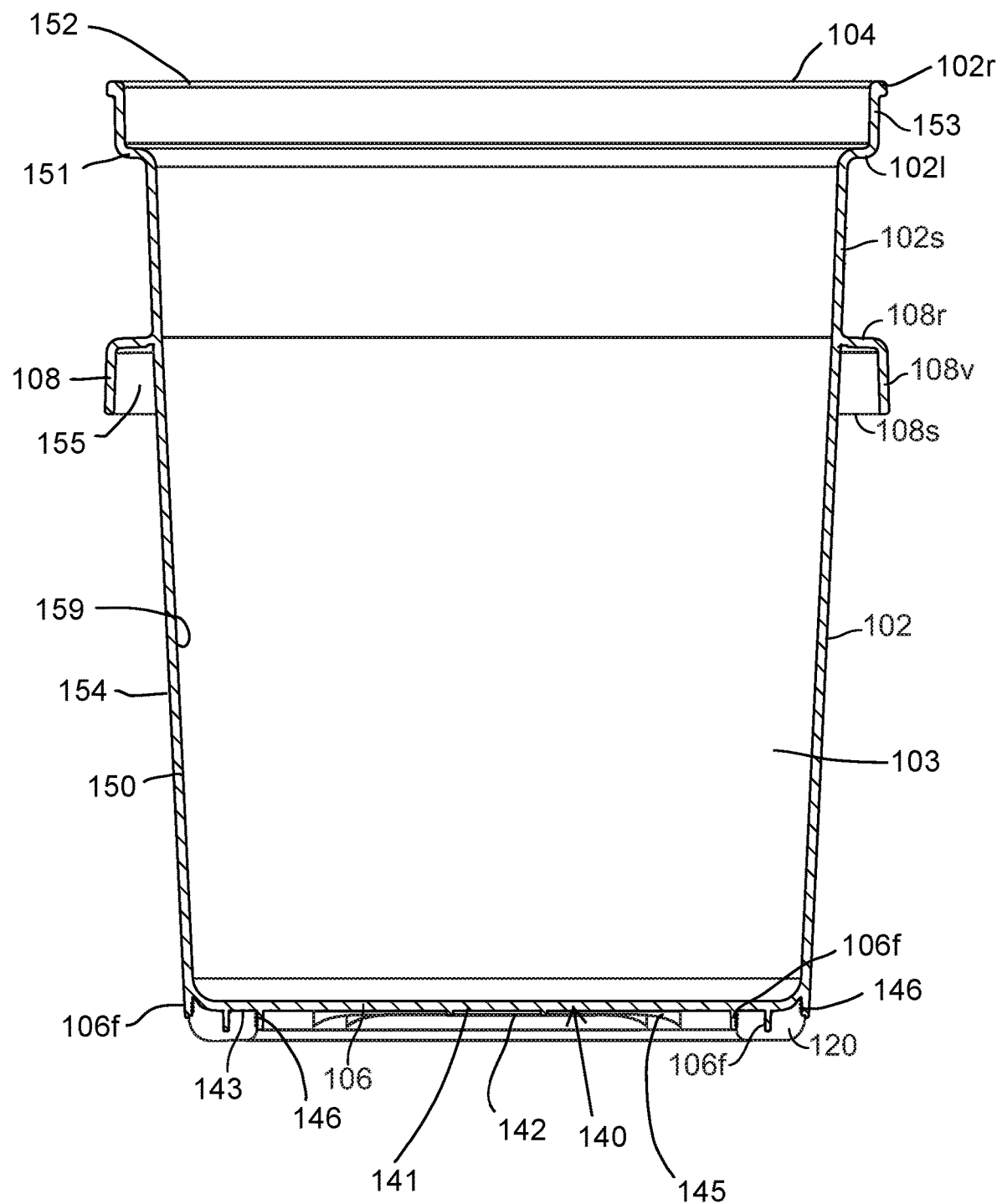
FIG. 4 is a cross-sectional view of the assembly of FIG. 1 with the lid and removable handle removed.
Figure 5:
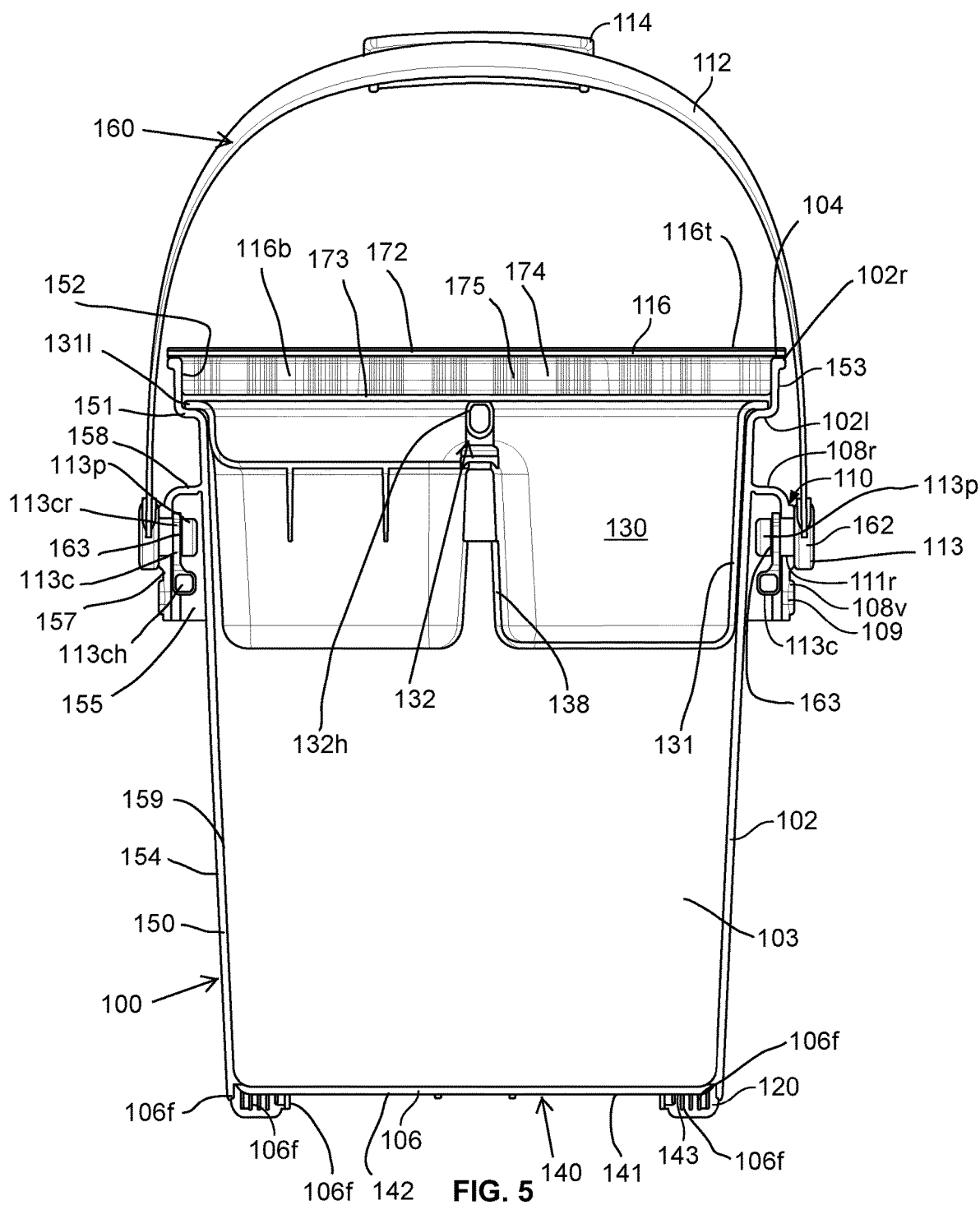
FIG. 5 is another cross-sectional side view of the assembly of FIG. 1, including one embodiment of a drop-in tray according to aspects of the disclosure with the tray having a tray handle shown in a retracted position.

The bottom 106 of the container 102 may include a pad 120 as described above, which can be used to provide a limited slip surface or slip-resistant surface. In one embodiment, the pad 120 may be formed of a flexible and/or low durometer material (e.g., rubber or silicone) that is overmolded, or injection molded, onto the base 141. As shown in FIGS. 3-5, the pad 120 may be connected at least partially within a cavity or channel 143 formed on the bottom surface 140 of the base 141 in one embodiment. The channel 143 may extend around an outer portion of the base 141, and in the embodiment of FIGS. 1-5, the channel 143 is an annular channel 143 that extends around the central recess 142. The cavity/channel 143 may have a different shape in another embodiment. It is understood that the base 141 may include multiple cavities or channels 143 with pads 120 formed therein. As also illustrated in FIGS. 4-5, the base 141 may include one or more downwardly projecting ribs 106f formed on the bottom surface 140 and within the channel 143 (if present). At least some of the rib(s) 106*f* penetrate the material of the pad 120 and are covered by the material forming the pad 120 when the pad 120 is overmolded onto the base 141. The rib(s) 106*f* may provide additional surface area and structure to which the molding material of the pad 120 can bind itself to retain and enhance the connection between the base 141 and the pad 120, as shown in FIGS. 4-5. In one embodiment, as illustrated in FIGS. 4-5, the base 141 includes as one or more ribs 106*f* that penetrate the pad 120 and are completely covered by the pad 120, as well as other ribs 106*f* that define the inner and outer bounds of the channel 143, which may be at least partially covered by the pad 120. The rib(s) 106*f* defining the channel 143 in FIGS. 4-5 have ridged or textured surfaces 146 facing into the channel 143 to engage and more securely retain the pad 120, and the penetrating rib(s) 106*f* may include such surfaces 146 on one or both sides as well in other embodiments. The rib(s) 106*f* that penetrate the pad 120 in FIGS. 4-5 may be formed to correspond to the shapes of the cavity/channel 143 and/or the pad 120. For example, the rib(s) 106*f* in the embodiment of FIGS. 1-5 may be arranged in an annular arrangement, such as a single annular rib 106*f* or multiple ribs 106*f* arranged in arcs to form an annular or substantially annular structure. The portion of the container 102 as shown in FIG. 4 has one or more ribs 106*f* penetrating the material of the pad 120 in an single annular arrangement that extends around the entire channel 143, while the portion of the container 102 in FIG. 5 has additional ribs 106*f* penetrating the material of the pad 120, some or all of which may be arranged in intermittent concentric annular arrangements. Further arrangements of ribs 106*f* may be incorporated into other embodiments.

The handle assembly 160 in the embodiment of FIGS. 1-7 includes a handle 112 and a handle connection structure for removably connecting the handle 112 to the container 102, including one or more handle connection members 113 configured for connection to the handle mounts 110 and fastening members 113*c* configured for connecting the connection members 113 to the handle mounts 110. In one embodiment, the handle 112 may be elongated and flexible, and may include, as an accessory, a removable sliding grip 114. The grip 114 can include a longitudinal gap, or slot, 115 allowing the grip 114 to be removed and replaced, as desired, as well as to enable a user to slide the grip 114 along the length of the handle 112. The handle 112 can, in certain examples, be fabricated from high tensile polyester webbing, but can be in other forms or formed of other materials, such as nylon in the form of a rope-like handle or metal. In one embodiment, the handle 112 is made from a flexible textile material, such as a woven or braided structure or other structure made from interconnected fibers, for example, a polyester or nylon woven textile.

The handle connection members 113 illustrated in FIGS. 1-6 each include a plug 113*p* that is inserted into the receptacles 111*r* on the handle mounts 110. The structure of the handle connection members 113 in this embodiment includes a base body 162 that is connected to one of the ends of the handle 112, with the plug 113*p* extending outwardly from the base body 162. Each plug 113*p* in the embodiment of FIGS. 1-6 has a notch or recess 163 configured for connection to the fastening members 113*c*, as described elsewhere herein. The recess 163 as illustrated in FIGS. 1-6 extends around the entire periphery of the plug 113*p*. It is understood that the handle connection members 113 may have different structures in other embodiments, and may have structures that are complementary with the structures of the handle mounts 110 to facilitate connection.

In one embodiment, the handle connection members 113 may be connected to the handle 112 by overmolding the handle connection members 113 to the ends of the handle 112. The handle connection members 113 in FIGS. 1-6 are each formed of a single molded piece, such that the base body 162 is integrally formed with the plug 113*p*. Such a single-piece handle connection member 113 may be molded onto the end of the handle 112 such that the end of the handle 112 is positioned inside the base body 162. In another embodiment, where the plug 113*p* may be a separate piece connected to the base body 162, the handle connection members 113 may be connected to the handle 112 by overmolding the base body 162 of each handle connection member 113 to the handle 112 and later connecting the plug 113*p* to the base body 162. As described herein, the handle 112 in one embodiment may be made of a textile material, and in this embodiment, the overmolded material forming the handle connection member 113 infiltrates and penetrates between the fibers of the textile material of the handle 112. In another embodiment, a different material may be used for the handle connection member 113 that has a structure that is porous, permeable, etc., and the overmolding process may cause the overmolded material of the base body 162 to infiltrate and penetrate into pores, interstices, or other permeable areas of the material. This overmolded connection structure creates an extremely strong and durable bond without the use of additional fastening components or materials, which add further expense and weight. In other embodiments, the handle connection members 113 may be connected to the handle 112 using a different technique.

Figure 6:
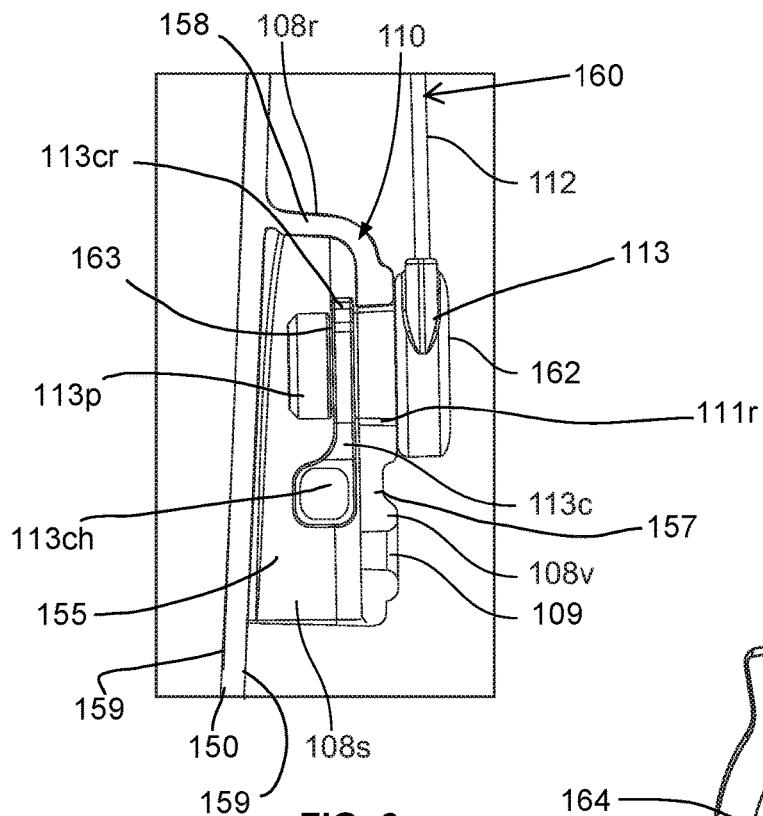
FIG. 6 is a magnified partial cross-sectional view of a plug, a fastening member, and a receptacle for the removable handle of FIG. 1.

The handle connection members 113 are configured for removable connection to the handle mounts 110 on the container 102 to connect the handle 112 and the handle assembly 160 to the container 102. In the configuration illustrated in FIGS. 1-6, the plug 113*p* of the handle connection member 113 is inserted into the receptacle 111*r* of the handle mount 110 on the container. A fastening member 113*c* may be engaged with the plug 113*p* to secure the plug 113*p* in connection with the handle mount 110 and prevent lateral forces on the handle 112 (e.g., during lifting or carrying) from causing the plug 113*p* to be pulled from the receptacle 111*r*. FIG. 6 illustrates the fastening members 113*c* being connected to the plugs 113*p* of the handle connection members 113 at a location that is beneath the overhang of the handle mount 110 and within the gap 155 between the handle mount 110 and the outer surface 154 of the sidewall 150. This configuration provides protection for the fastening members 113*c*, to resist inadvertent contact that may cause the fastening members 113*c* to become disconnected.

Figure 7:
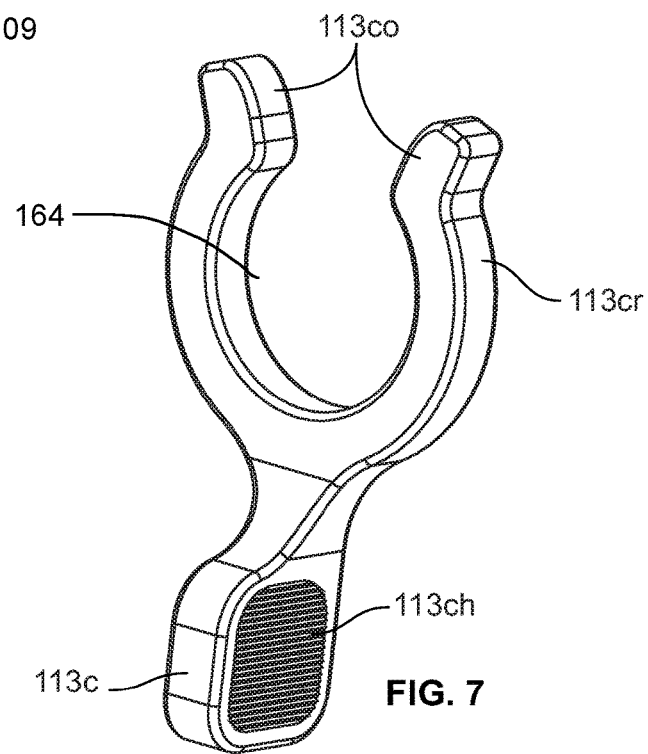
FIG. 7 is a perspective view of one embodiment of the fastening member for the plug of the removable handle, in the form of a retainer clip.

The fastening member 113*c* is illustrated in FIGS. 6 and 7, and in this embodiment, the fastening member 113*c* is in the form of a retainer clip. The fastening member 113*c* as illustrated in FIGS. 6-7 includes a handle portion or grip portion 113*ch* providing a gripping surface for manipulation by the user during connection and removal of the fastening member 113*c* with the plug 113*p*. The fastening member 113*c* also includes two legs 113*cr* extending from the grip portion 113*ch*, where a slot 164 is defined between the legs 113*cr*. The legs 113*cr* in the embodiment of FIGS. 6-7 are bowed apart, and the slot 164 has an open end having flared tips 113*co* to facilitate sliding the fastening member 113*c* over the plug 113*p*. This clip 113*c* can be formed of any suitable material that is sufficiently rigid and yet sufficiently flexible and resilient to enable installation and removal of the clip 113c on the plug 113p by the user. In one embodiment, the fastening member 113c is connected to the plug 113p by inserting the plug 113p within the slot 164, such that the legs 113cr fit within or otherwise engage the recess 163 on the plug 113p. As shown in FIG. 6, the legs 113cr of the fastening member 113c are received within the recess 163 on opposite sides of the plug 113p. When the handle 112 is desired to be removed from the container 102, the user can grasp the grip portion 113ch and pull the fastening member 113 away from the plug 113p to permit the plug 113p to be removed from the handle mount 110. The resiliency of the legs 113cr of the fastening member 113c permits the legs 113cr to be spread slightly apart when engaging the fastening member 113c with the plug 113p in the embodiment of FIGS. 1-7. The fastening member 113c may be differently configured in other embodiments, such as various clamps, screws, bolts, pins (e.g., a cotter pin), keys, tabs, and other retaining or locking structures. For example, the fastening member 113c may include a hinge/spring combination or other structure for assisting engagement with the plug 113p.

Figure 8:
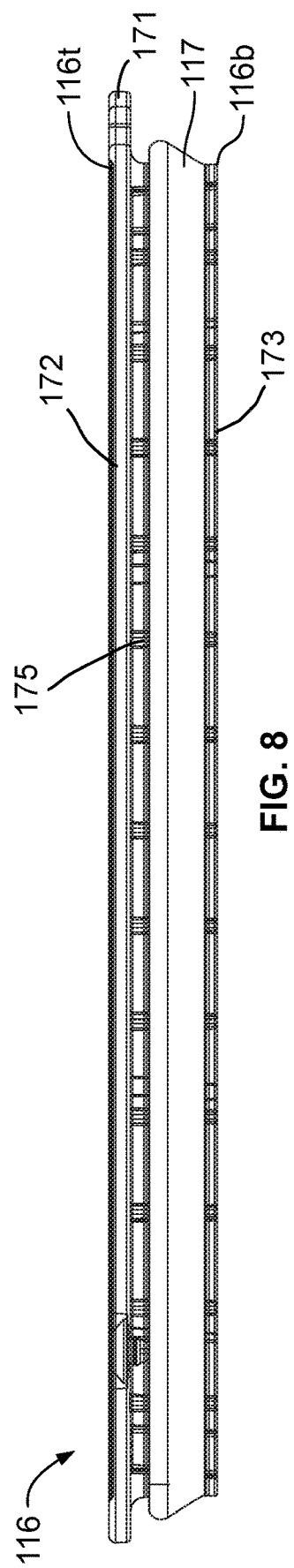
FIG. 8 is a side elevation view of the removable lid of the assembly of FIG. 1.
Figure 12:
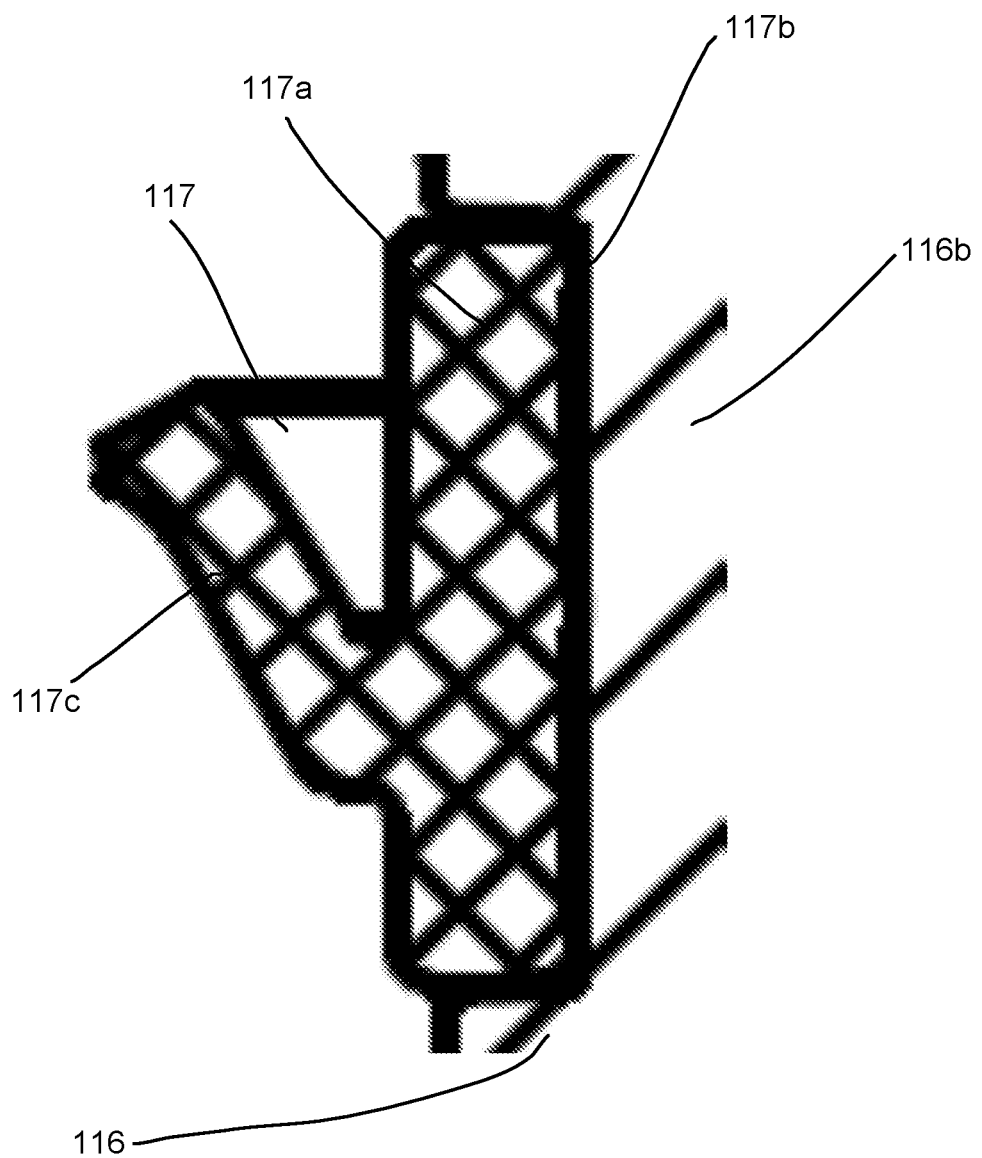
FIG. 12 is a cross-sectional side view showing one embodiment of a gasket for use with the lid of FIG. 8 according to aspects of the disclosure.

The container assembly 100 can also include a lid 116 removably connected to the top 104 of the container 102 to at least partially cover the opening 152. The lid 116 is illustrated in FIGS. 1, 5, and 8. Referring to FIG. 8, the lid 116 includes a top or upper portion 116t, and a bottom or lower portion 116b that is at least partially received within the opening 152 when the lid 116 is connected to the container 102. The lower potion 116b in the embodiment of FIGS. 1, 5, and 8 includes a seal or gasket 117 that provides a seal (e.g., against moisture, external contamination, etc.) between the interior of the container 102 and the external environment when the lid 116 is press-fitted into the opening 152 of the container 102. The gasket 117 also provides a frictional retaining function to retain the lid 116 in place on the container 102. FIG. 12 illustrates one example of a gasket 117 for use with the lid 116. The gasket 117 in FIG. 12 includes an annular base 117a that is received within an annular recess 117b on the lower portion 116b of the lid 116, and an annular or frusto-conical lip 117c that extends from the base 117b angularly outward and upward toward the upper portion 116t of the lid 116. Other gasket 117 configurations may be used in other embodiments.

The lid 116 in the embodiment of FIGS. 1, 5, and 8 has a stepped configuration, such that the peripheral dimension (e.g., diameter) of the upper portion 116t is larger than that of the lower portion 116b. In this configuration, the lower portion 116b fits within the container opening 152, while the upper portion 116t is substantially flush with the outer surface 154 of the sidewall 150 at the top 153 of the sidewall 150. In the embodiment of FIGS. 1 and 5, the upper portion 116t is substantially flush with the outer surface 154 at the rim 102r. It is understood that the upper portion 116t may be considered to be flush or substantially flush with the outer surface 154 of the sidewall 150 even if the components are not flush around the entire outer periphery of the container 102. For example, the lid 116 in FIGS. 1 and 5 has a grasping tab 171 extending outward from the edge of the lid 116, and this grasping tab 171 extends further outward of the outer surface 154 of the sidewall 150.

Additionally, the lid 116 in the embodiment of FIGS. 1, 5, and 8 has an internal reinforcing structure. In this embodiment, the lid 116 has a top wall 172 and a reinforcing structure including a plurality of internal reinforcing members 175 connected to the underside of the top wall 172 and extending downward below the top wall to form a bottom 173 of the lid 116. The reinforcing members 175 in the embodiment of FIGS. 1, 5, and 8 are arranged in a cellular structure, e.g., a honeycomb or hexagonal cellular structure, including a plurality of cells 174 that are open on the bottom 173 of the lid 116 in this embodiment. In another embodiment, the lid 116 may further include a bottom wall forming the bottom 173 of the lid 116 and defining an enclosed or semi-enclosed space between the top wall 172 and the bottom wall. In this configuration, the reinforcing members 175 may be positioned within the space and may be connected to and extend between the top wall 172 and the bottom wall. Some or all of the cells 174 in this configuration may be enclosed or substantially enclosed. It is understood that other cellular and non-cellular structures may be used.

Figure 11:
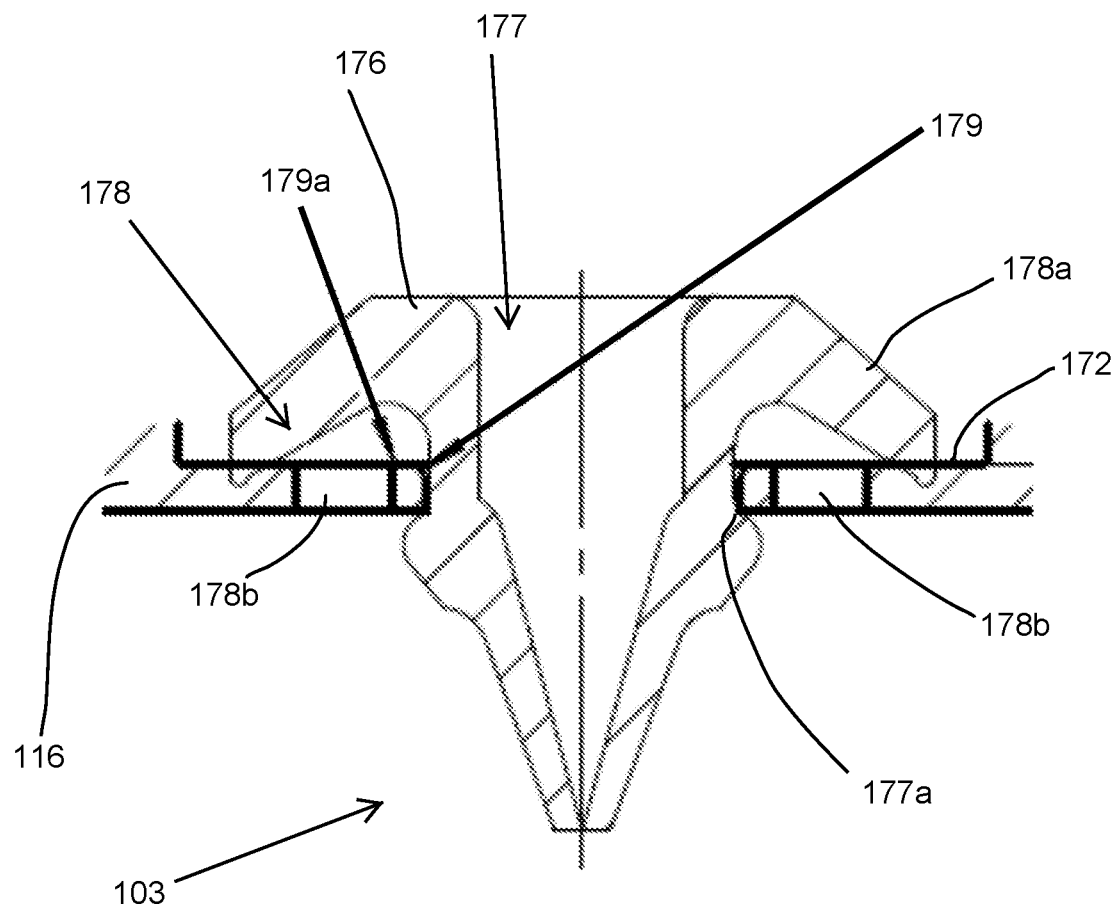
FIG. 11 is a cross-sectional side view showing one embodiment of a pressure relief valve according to aspects of the disclosure.

In one embodiment, the lid 116 may include a pressure relief mechanism, which may function to permit air inside the container 102 to escape if excessive pressure builds up due to tight sealing, e.g., by the gasket 117. FIG. 11 illustrates an embodiment of such a pressure relief mechanism in the form of a pressure release valve 176 connected to and extending through the top wall 172 of the lid 116. The valve 176 in FIG. 11 is a one-way umbrella valve, with a mounting portion 177 and a valve portion 178 connected to the mounting portion and permitting one-way airflow through the lid and out of the container cavity 103 (upward in FIG. 11) while providing a waterproof seal. The mounting portion 177 is a column or tubular body that securely mounts the valve 176 to the lid 116. The valve portion 178 has a lip portion 178a extending downward and outward from the mounting portion 177 in a frusto-conical configuration and covering a plurality of passages 178b through the lid 116. This configuration resists flow of moisture and/or air into the container cavity 103 through the lip portion 178a and the passages 178b, while permitting air to flow out of the cavity 103 through the passages 178b when pressure in the container 102 increases, e.g., during insertion of the lid 116 or as a result of temperature changes. The mounting portion 177 extends through an opening 179 in the top wall 172 of the lid 116, and the opening 179 may be positioned in a thinned or recessed portion 179a of the lid 116. The mounting portion 177 includes an annular lip or groove 177a that engages the edge of the opening 179 in a sealing configuration and retains the valve 176 in connection with the lid 116 once inserted. The entire valve 176 in FIG. 11 is formed of a single piece of a flexible polymer material, e.g., silicone rubber or other elastomeric material, in one embodiment, but may be made of other materials or multiple materials in other embodiments. Other valves, including other one-way or two way valves, may be used in other embodiments.

Figure 9:
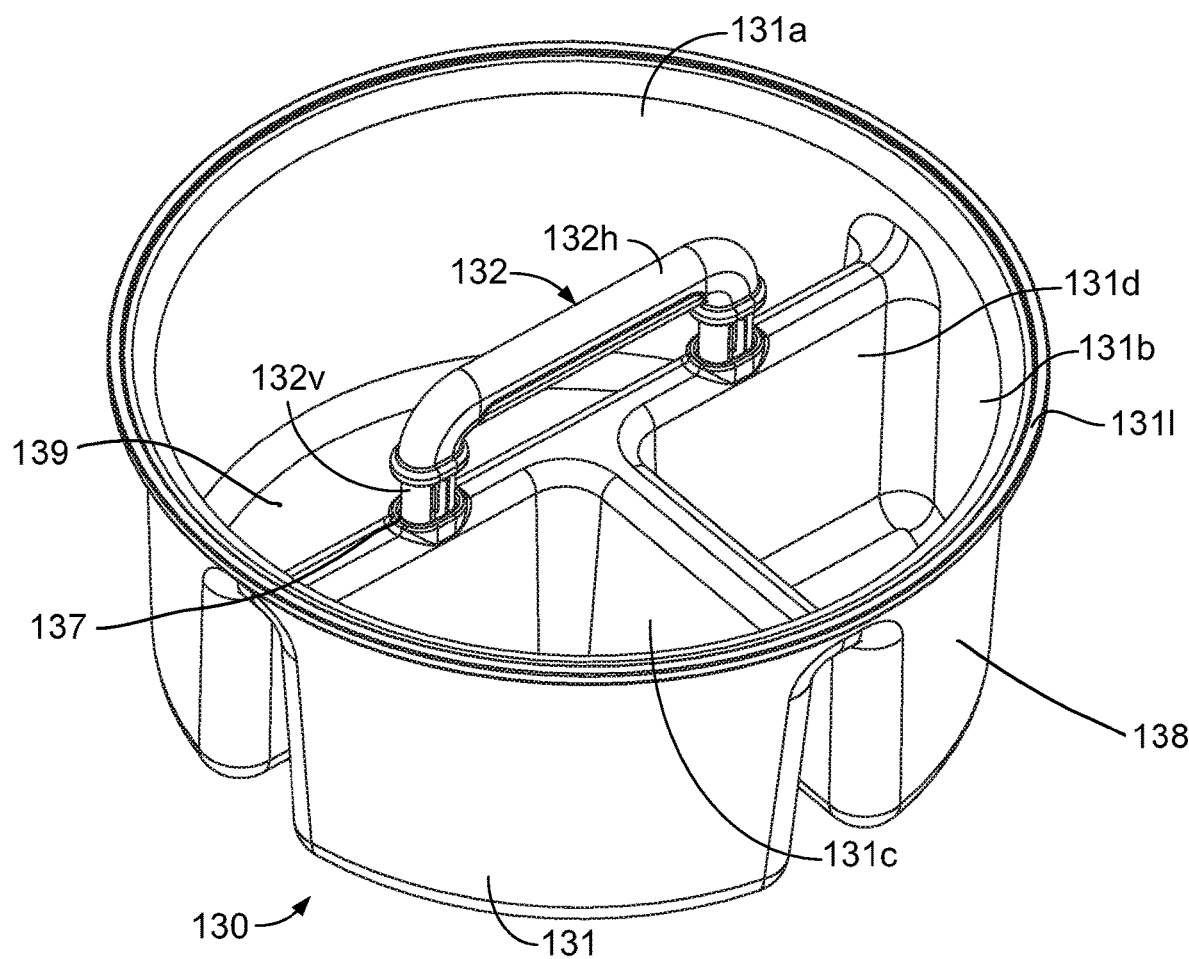
FIG. 9 is an upper perspective view of the drop-in tray of the assembly of FIG. 1, with the tray handle shown in an extended position.
Figure 10:
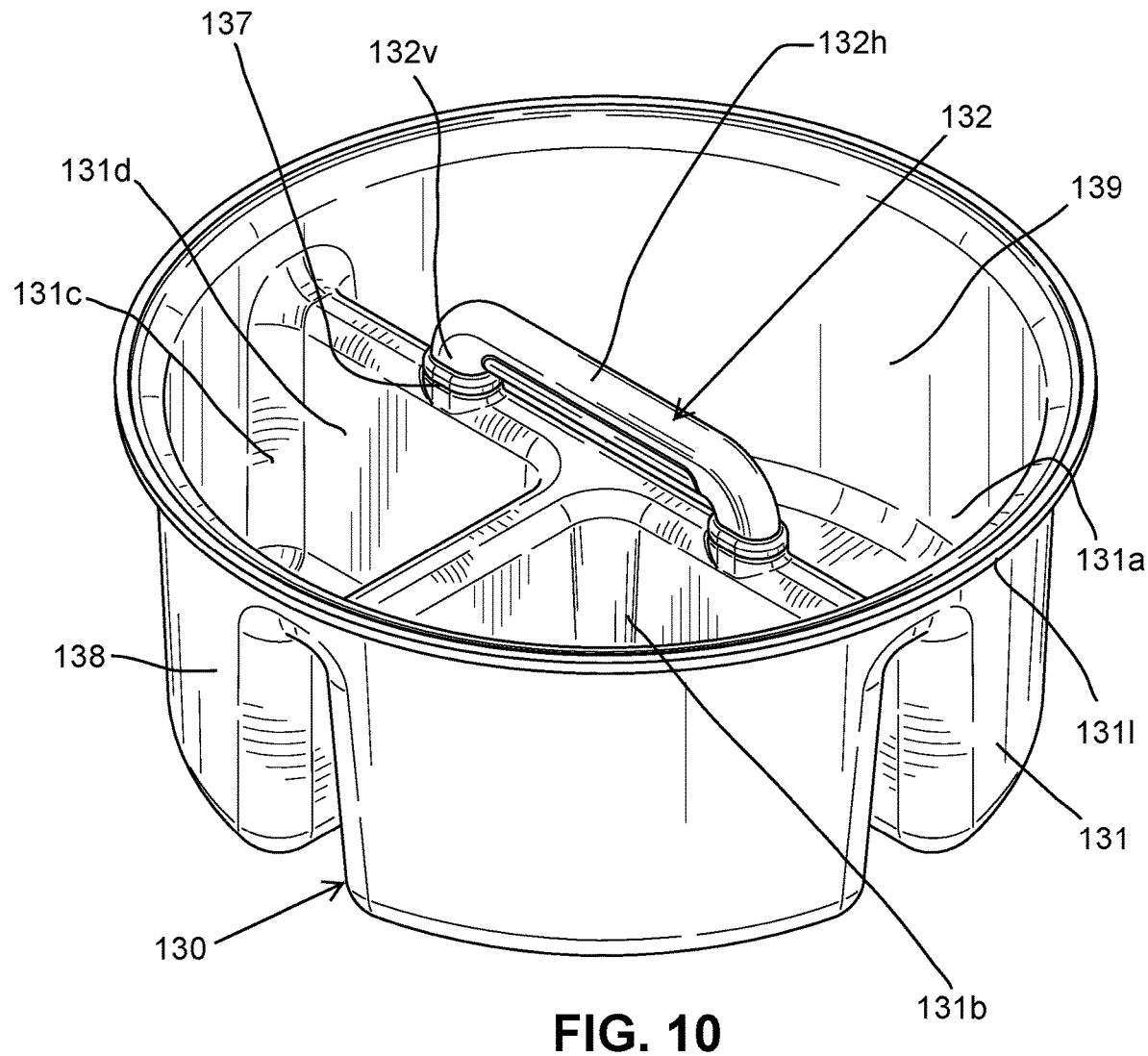
FIG. 10 is an upper perspective view of the tray of FIG. 9, with the tray handle in the retracted position.

The container assembly 100 may also include a tray 130 that can be inserted within the cavity 103 of the container 102, in one embodiment. An example embodiment of the tray 130 is illustrated in FIGS. 5 and 9-10. The container 102 may further include structure for supporting the tray 130 within the cavity 103. In one embodiment, the sidewall 150 of the container 102 has a horizontal ledge 102l on the inner surface 159 of the sidewall 150, where a portion of the tray 130 sits on the ledge 102l to support the tray 130. The ledge 102l in the embodiment of FIGS. 1-5 is formed by a shoulder 151 on the sidewall 150, i.e., a stepped diameter increase in the sidewall 150 that extends around the entire sidewall 150. In other embodiments, the ledge 102l may have a different configuration, such as a cantilevered shelf that extends inwardly from the sidewall 150, and the ledge 102l may extend intermittently around the inner surface 159 of the sidewall 150 in another embodiment. The shoulder 151 and the ledge 102l are located above the mid-height of the sidewall 150 as shown in FIG. 5.

Referring to FIGS. 9 and 10, in accordance with exemplary embodiments, the drop-in-tray 130 includes a tray body 138 with an outer wall 131 that defines a tray cavity 139 and a tray handle 132 connected to the tray body 138 for grasping by a user. The tray 130 may have structure configured to rest on the ledge 102*l* of the container, and the tray 130 in the embodiment of FIGS. 5 and 9-10 includes a lip 131*l* extending radially outward from the top of the outer wall 131, and the lip 131*l* sits on the ledge 102*l* to support the tray 130 within the cavity 103. The outer wall 131 in FIGS. 5 and 9-10 is tapered radially inward as it extends downward from the ledge 131*l*. The tray cavity 139 can include multiple cavities 131*a*, 131*b*, 131*c* for storage, separated by one or more vertical internal dividers 131*d*. The tray handle 132 in FIGS. 5 and 9-10 includes a horizontal portion 132*h* configured for grasping by the user and a vertical 132*v* portion connecting the tray handle 132 to the tray body 138.

In one example embodiment, the handle 132 is collapsible so as to allow at least a portion of the handle 132 to be collapsed, or recessed, as desired, defining at least an extended position and a retracted position. The handle 132 in the embodiment of FIGS. 5 and 9-10 collapses in a sliding (e.g., telescopic) manner, with the vertical portion 132*v* of the handle 132 sliding or telescoping linearly upward and downward within apertures 137 in the tray body 138 to extend and collapse the handle 132. As shown in FIGS. 5 and 9-10, the handle 132 in this embodiment is moveable to a retracted position (FIGS. 5 and 10) where the handle 132 fits below the lid 116 when the tray 130 is received in the cavity 103 of the container 102 and the lid 116 is connected to the container 102. This is to allow for placement of the lid 116 following insertion of the tray 130. In one embodiment, the retracted handle 132 is positioned entirely at or below the plane of the tray lip 131*l* and/or does not extend above the lip 131*l*. In another embodiment, the retracted handle 132 may extend slightly above the plane of the tray lip 131*l* but still below the adjacent portions of the lid 116. The handle 132 in the embodiment of FIGS. 5 and 9-10 is also moveable to an extended position (FIG. 9), where the handle 132 is positioned farther upward relative to the retracted position. This allows the handle 132 to be moved upwardly to facilitate removal and carrying of the tray 130. Alternate collapsible structures can be used as well, as will be appreciated by one of ordinary skill in the art. For example, a foldable collapsible structure could be used, thereby enabling folding of the handle downward to provide clearance for the lid 116. In a further embodiment, the lid 116 may be provided with accommodating structure, such as a recess on the underside thereof, to assist in accommodating the handle 132 in combination with or independently from the use of a collapsible structure for the handle 132.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," etc., as used herein, are intended for illustrative purposes only and do not limit the embodiments in any way. In particular, these terms do not imply any order or position of the components modified by such terms. Additionally, the term "plurality," as used herein, indicates any number greater than one, either disjunctively or conjunctively, as necessary, up to an infinite number. Further, as used herein, "horizontal" and "vertical" are general relative terms. The definition of "vertical" is not limited to structures that are precisely perpendicular to the ground, the definition of "horizontal" is not limited to structures that are precisely parallel to the ground, and reference to different components as being "horizontal" and "vertical" does not imply that these components are precisely perpendicular to each other. Accordingly, while specific embodiments have been illustrated and described, numerous modifications come to mind without significantly departing from the spirit of the invention.

What is claimed is:

1. A portable container assembly comprising:
   a container comprising:
      a bottom;
      a sidewall connected to the bottom and extending upward from the bottom to define an internal cavity with an opening at a top of the sidewall, the sidewall having an inner surface and an outer surface;
      first and second handle mounts connected to the outer surface of the sidewall, each of the first and second handle mounts having a vertical connecting portion with a receptacle defined therein, the vertical connecting portion being spaced from the sidewall to define a gap between the vertical connecting portion and the outer surface of the sidewall; and
      a skirt connected to the outer surface of the sidewall and extending outward and downward from the outer surface of the sidewall, such that a portion of the skirt is spaced from the sidewall, wherein the skirt and the first and second handle mounts are integrally formed as a single piece that extends around a periphery of the sidewall, and the gap between the vertical connecting portions and the outer surface of the sidewall further extends between the skirt and the sidewall; and
   a handle assembly comprising a handle configured for use in lifting the portable container assembly and first and second connection members connected to opposed ends of the handle, wherein the first and second connection members are removably connected to the first and second handle mounts to removably connect the handle assembly to the container, each of the first and second connection members comprising a plug, wherein the plug of the first connection member is received within the receptacle of the first handle mount and the plug of the second connection member is received within the receptacle of the second handle mount;
   wherein the handle assembly further comprises first and second removable fastening members, wherein the first and second removable fastening members are engaged with the plugs of the first and second connection members at locations within the gap to secure the plugs within the receptacles of the first and second handle mounts;
   wherein the first and second removable fastening members each comprise a grip portion configured for manipulation by a user and a pair of bowed legs extending from the grip portion, wherein a slot is defined between the pair of bowed legs, and wherein the first and second removable fastening members are engaged with the plugs of the first and second connection members such that the plug of the first connection member is received within the slot of the first removable fastening member and the pair of bowed legs of the first removable fastening member are positioned on opposite sides of the plug of the first connection member, and the plug of the second connection member is received within the slot of the second removable fastening member and the pair of bowed legs of the second removable fastening member are positioned on opposite sides of the plug of the second connection member; and wherein the grip portion of the first removable fastening member is enlarged in a transverse direction relative to the pair of bowed legs of the first removable fastening member, wherein the grip portion has a thickness in the transverse direction that is greater than a width of the grip portion, and wherein the width of the grip portion is defined in a perpendicular direction to the transverse direction, and the grip portion of the second removable fastening member is enlarged in a transverse direction relative to the pair of bowed legs of the second removable fastening member, wherein the grip portion has a thickness in the transverse direction that is greater than a width of the grip portion, and wherein the width of the grip portion is defined in a perpendicular direction to the transverse direction.

2. The portable container assembly of claim 1, wherein a plurality of ports are defined in the skirt and distributed around the periphery of the sidewall, each of the ports being configured for connection to external components.

3. The portable container assembly of claim 1, wherein the skirt comprises a horizontal skirt portion connected to the outer surface of the sidewall and extending outwardly from the outer surface and a vertical skirt portion connected to the horizontal skirt portion and extending downward from the horizontal skirt portion, and wherein the first and second handle mounts each further comprise a transverse portion extending outward from the outer surface of the sidewall such that the vertical connecting portion extends downward from the transverse portion.

4. The portable container assembly of claim 3, wherein the transverse portions of the first and second handle mounts are continuous with the horizontal skirt portion.

5. The portable container assembly of claim 3, wherein the horizontal skirt portion and the transverse portions of the first and second handle mounts combine to form a continuous surface extending around the periphery of the sidewall.

6. The portable container assembly of claim 1, wherein the handle is formed of a flexible material, and the first and second connection members each comprise a base body connected to the handle, and wherein the base body of each of the first and second connection members is enlarged with respect to the plug thereof, and the plug of each of the first and second connection members is connected to the base body thereof and projects from the base body.

7. The portable container assembly of claim 1, wherein the sidewall comprises a shoulder located above a mid-height of the sidewall and forming a horizontal ledge on the inner surface of the sidewall, the portable container assembly further comprising:

a lid removably connected to the container at the top of the sidewall to at least partially cover the opening, the lid having a plurality of internal reinforcing members arranged in a honeycomb cellular structure, the lid further comprising a lower portion received within the opening of the container and having a gasket engaging the inner surface of the sidewall when the lid is connected to the container and an upper portion having a larger peripheral dimension than the lower portion to create a stepped configuration, wherein the upper portion extends outwardly over the top of the sidewall, and wherein an outer periphery of the upper portion is substantially flush with the outer surface at the top of the sidewall; and a tray comprising a tray body having an outer wall defining a tray cavity and one or more internal dividers forming compartments within the tray cavity, a horizontal lip extending outwardly from the outer wall, and a collapsible tray handle connected to the tray body and configured for collapsing in a sliding manner, such that the tray handle is moveable by sliding between at least a retracted position where the tray handle does not extend above the horizontal lip, and an extended position where the tray handle extends a greater distance upward from the tray body relative to the retracted position, wherein the tray is received within the internal cavity of the container and the horizontal lip rests on the horizontal ledge to support the tray within the internal cavity, and wherein the tray handle in the retracted position fits below the lid when the tray is received within the internal cavity and the lid is connected to the container.

8. The portable container assembly of claim 1, wherein the bottom comprises a base and a pad connected to a bottom side of the base, the base having a rib extending downward from the bottom side of the base, wherein the pad is formed from a flexible material that is overmolded onto the bottom side of the base, such that the rib penetrates the pad and is covered by the flexible material.

9. A portable container assembly comprising:
a container comprising:
a bottom;
a sidewall connected to the bottom and extending upward from the bottom to define an internal cavity with an opening at a top of the sidewall, the sidewall having an inner surface and an outer surface;
first and second handle mounts connected to the outer surface of the sidewall, each of the first and second handle mounts having a connecting portion, the connecting portion being spaced from the sidewall to define a gap between the connecting portion and the outer surface of the sidewall; and
a skirt connected to the outer surface of the sidewall, wherein the skirt comprises a horizontal skirt portion extending outward from the outer surface of the sidewall and a vertical skirt portion extending from the horizontal skirt portion, such that a portion of the skirt is spaced from the sidewall, wherein the skirt and the first and second handle mounts are integrally formed as a single piece that extends around a periphery of the sidewall, and the gap between the connecting portions and the outer surface of the sidewall further extends between the skirt and the sidewall; and
a handle assembly comprising a handle configured for use in lifting the portable container assembly and first and second connection members connected to opposed ends of the handle, wherein the first and second connection members are removably connected to the connecting portions of the first and second handle mounts to removably connect the handle assembly to the container; and wherein a plurality of ports are defined in the skirt and distributed around the periphery of the sidewall, each of the ports being configured for connection to external components, wherein the plurality of ports include a first port on the horizontal skirt portion and a second port on the vertical skirt portion.

10. The portable container assembly of claim 9, wherein the first and second handle mounts each further comprise a transverse portion extending outward from the outer surface of the sidewall such that the connecting portion extends downward from the transverse portion.

11. The portable container assembly of claim 10, wherein the transverse portions of the first and second handle mounts are continuous with the horizontal skirt portion.

12. The portable container assembly of claim 10, wherein the horizontal skirt portion and the transverse portions of the first and second handle mounts combine to form a continuous surface extending around the periphery of the sidewall.

13. A container comprising:
a bottom;
a sidewall connected to the bottom and extending upward from the bottom to define an internal cavity with an opening at a top of the sidewall, the sidewall having an inner surface and an outer surface;
first and second handle mounts connected to the outer surface of the sidewall, each of the first and second handle mounts having a transverse portion extending outward from the outer surface of the sidewall and a vertical connecting portion extending downward from the transverse portion, each of the vertical connecting portions having a receptacle defined therein, the receptacles being configured to receive connection members of a handle assembly for connecting the handle assembly to the container, and each of the vertical connecting portions being spaced outwardly from the sidewall; and
a skirt connected to the outer surface of the sidewall and comprising a horizontal skirt portion connected to the outer surface of the sidewall and extending outwardly from the outer surface and a vertical skirt portion connected to the horizontal skirt portion and extending downward from the horizontal skirt portion, such that the vertical skirt portion is spaced outwardly from the sidewall, wherein the skirt and the first and second handle mounts are integrally formed as a single piece that extends around a periphery of the sidewall;
wherein the transverse portion and the vertical connecting portion of the first and second handle mounts are located above the horizontal skirt portion of the skirt;
wherein a plurality of ports are defined in the skirt and distributed around the periphery of the sidewall, each of the ports being configured for connection to external components; and
wherein the plurality of ports include a first port on the horizontal skirt portion and a second port on the vertical skirt portion, wherein the second port is below the first handle mount.

14. The container of claim 13, wherein the transverse portions of the first and second handle mounts are continuous with the horizontal skirt portion.

15. The container of claim 13, wherein the horizontal skirt portion and the transverse portions of the first and second handle mounts combine to form a continuous surface extending around the periphery of the sidewall.

16. The container of claim 13, wherein the bottom comprises a base and a pad connected to a bottom side of the base, the base having a rib extending downward from the bottom side of the base, wherein the pad is formed from a flexible material that is overmolded onto the bottom side of the base, such that the rib penetrates the pad and is covered by the flexible material.

* * * * *